(12) United States Patent
O'Connell (10) Patent No.: US 11,655,149 B1
(45) Date of Patent: May 23, 2023

(54) SULFUR RECOVERY BY SOLIDIFYING SULFUR ON REACTOR CATALYST

(71) Applicant: Saudi Arabian Oil Company, Dhahran (SA)

(72) Inventor: John O'Connell, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/517,280

(22) Filed: Nov. 2, 2021

(51) Int. Cl.
| | | |
|---|---|---|
| *C01B 17/04* | (2006.01) | |
| *B01J 8/06* | (2006.01) | |
| *B01J 8/36* | (2006.01) | |
| *B01J 19/24* | (2006.01) | |
| *B01J 21/04* | (2006.01) | |
| *B01J 21/06* | (2006.01) | |
| *F22B 1/16* | (2006.01) | |

(52) U.S. Cl.
CPC ........... *C01B 17/0456* (2013.01); *B01J 8/062* (2013.01); *B01J 8/36* (2013.01); *B01J 19/245* (2013.01); *B01J 21/04* (2013.01); *B01J 21/063* (2013.01); *C01B 17/0417* (2013.01); *C01B 17/0434* (2013.01); *B01J 2208/0015* (2013.01); *B01J 2208/00141* (2013.01); *B01J 2208/00504* (2013.01); *F22B 1/16* (2013.01)

(58) Field of Classification Search
CPC ... F22B 1/16; C01B 17/0456; C01B 17/0434; C01B 17/0417; B01J 8/062; B01J 8/36; B01J 21/04; B01J 21/063; B01J 19/245; B01J 2208/00504; B01J 2208/00141; B01J 2208/0015

See application file for complete search history.

(56) References Cited

U.S. PATENT DOCUMENTS

| | | |
|---|---|---|
| 4,391,791 A | 7/1983 | Palm et al. |
| 4,526,590 A | 7/1985 | Palm et al. |
| 5,807,410 A | 9/1998 | Borsboom et al. |
| 2015/0132213 A1* | 5/2015 | O'Connell .......... C01B 17/0456 423/574.1 |

FOREIGN PATENT DOCUMENTS

DE 29 23 895 B * 10/1980 ......... B01D 53/8615

* cited by examiner

*Primary Examiner* — Timothy C Vanoy
(74) *Attorney, Agent, or Firm* — Fish & Richardson P.C.

(57) ABSTRACT

A system and method including a sulfur recovery system (SRU) having a Claus system, reacting hydrogen sulfide and oxygen in a furnace to give sulfur dioxide, performing a Claus reaction in the furnace to give elemental sulfur, performing the Claus reaction in a Claus reactor to give elemental sulfur at a temperature greater than a dew point of the elemental sulfur, performing the Claus reaction in a Claus cycling reactor to give elemental sulfur at a temperature less than a solidification temperature of the elemental sulfur, depositing the elemental sulfur as solid elemental sulfur on catalyst in the Claus cycling reactor, and regenerating (heating) the Claus cycling reactor thereby forming elemental sulfur vapor from the solid elemental sulfur.

24 Claims, 3 Drawing Sheets

SULFUR RECOVERY BY SOLIDIFYING SULFUR ON REACTOR CATALYST

TECHNICAL FIELD

This disclosure relates to sulfur recovery.

BACKGROUND

Hydrogen sulfide can be a byproduct of processing natural gas and refining sulfur-containing crude oils. Other industrial sources of hydrogen sulfide may include pulp and paper manufacturing, chemical production, waste disposal, and so forth. In certain instances, hydrogen sulfide can be considered a precursor to elemental sulfur.

Sulfur recovery may refer to conversion of hydrogen sulfide ($H_2S$) to elemental sulfur, such as in a sulfur recovery unit (SRU) (e.g., Claus system). The most prevalent technique of sulfur recovery is the Claus system, which may be labeled as the Claus process, Claus plant, Claus unit, and the like. The Claus system includes a thermal reactor (e.g., a furnace) and multiple catalytic reactors to convert $H_2S$ into elemental sulfur.

A conventional Claus system can recover between 95% and 98% of $H_2S$. The percent recovery may depend on the number of Claus catalytic reactors. The tail gas from the Claus system may have the remaining (residual) $H_2S$, such 2% to 5% of the equivalent $H_2S$ in the feed gas. The Claus tail gas can be treated to recover this remaining $H_2S$ equivalent. In particular, the addition of a tail gas treatment (TGT) unit, also known as TGTU, tail gas (TG) unit, and TGU, can increase sulfur recovery to or above 99.9%, but generally employs complex and expensive equipment.

There is increasing demand to achieve higher sulfur removal and recovery efficiency due to emissions regulations. Environmental regulations regarding sulfur oxides ($SO_x$) emissions place a stringent requirement on commercial sulfur recovery. Most countries require sulfur recovery efficiency in the range of 98.5% to 99.9%, or greater.

SUMMARY

An aspect relates to a method of operating a sulfur recovery system (SRU) including a Claus system. The method includes reacting hydrogen sulfide and oxygen in a furnace to give sulfur dioxide, and performing a Claus reaction including reacting hydrogen sulfide and sulfur dioxide in the furnace to give elemental sulfur. The method includes performing the Claus reaction including reacting hydrogen sulfide and sulfur dioxide from the furnace in a Claus reactor to give elemental sulfur at a temperature greater than a dew point of the elemental sulfur in the Claus reactor. The Claus reactor has a first catalyst to promote the Claus reaction. The method includes performing the Claus reaction including reacting hydrogen sulfide and sulfur dioxide from the Claus reactor in a Claus cycling reactor to give elemental sulfur at a temperature less than a solidification temperature of the elemental sulfur, and depositing the elemental sulfur as solid elemental sulfur on second catalyst in the Claus cycling reactor. The Claus cycling reactor has the second catalyst to promote the Claus reaction. The method includes regenerating the Claus cycling reactor, including heating the Claus cycling reactor, thereby forming elemental sulfur vapor from the solid elemental sulfur, and discharging the elemental sulfur vapor from the Claus cycling reactor.

Another aspect relates to a method of operating a SRU including a Claus system. The method includes providing hydrogen sulfide and sulfur dioxide from a thermal stage to a Claus reactor. The thermal stage includes a reaction furnace, a waste heat boiler, and a condenser heat exchanger. The Claus reactor has catalyst to perform a Claus reaction. The method includes reacting the hydrogen sulfide and the sulfur dioxide in the Claus reactor at a temperature greater than a dew point of sulfur to give sulfur vapor. The method includes reacting hydrogen sulfide and sulfur dioxide in multiple Claus cycling reactors downstream of the Claus reactor at a temperature lower than a solidification of sulfur to give solid sulfur in the multiple Claus cycling reactors, wherein the multiple Claus cycling reactor each have a catalyst to perform the Claus reaction. The method includes heating the multiple Claus cycling reactors, thereby forming sulfur vapor from the solid sulfur, and discharging the sulfur vapor from the multiple Claus cycling reactors and condensing the sulfur vapor.

Yet another aspect relates to SRU including a Claus system. The Claus system includes a thermal stage having a reaction furnace to convert hydrogen sulfide into sulfur dioxide and elemental sulfur. The thermal stage has a waste heat boiler to recover heat from a combustion product discharged from the reaction furnace, the combustion product being a process stream including hydrogen sulfide, sulfur dioxide, and elemental sulfur. The thermal stage may have a first condenser heat exchanger to receive the process stream discharged from the waste heat boiler and condense elemental sulfur in the process stream for removal of the elemental sulfur as condensed from the process stream. A Claus reactor stage includes a Claus reactor having a first catalyst to convert hydrogen sulfide and sulfur dioxide received from the thermal stage into elemental sulfur at a temperature above a dew point of the elemental sulfur. The Claus system includes Claus cycling reactors downstream of the Claus reactor stage. The Claus cycling reactors each have a second catalyst to convert hydrogen sulfide and sulfur dioxide into elemental sulfur at a temperature below a solidification temperature of the elemental sulfur to solidify the elemental sulfur as solid elemental sulfur on the second catalyst. The Claus cycling reactors each have an internal heat exchanger to cool the Claus cycling reactors, respectively, to below the solidification temperature of the elemental sulfur.

Yet another aspect relates to a SRU including a Claus system. The Claus system includes a thermal stage including a reaction furnace to convert hydrogen sulfide into sulfur dioxide and elemental sulfur, a waste heat boiler to recover heat from an exhaust of the reaction furnace, and a first condenser heat exchanger to condense elemental sulfur in the exhaust and discharge hydrogen sulfide and sulfur dioxide from the exhaust to a Claus reactor. The Claus system includes the Claus reactor having a first catalyst to convert hydrogen sulfide and sulfur dioxide received from the thermal stage into elemental sulfur at a temperature above a dew point of the elemental sulfur and discharge a process stream including hydrogen sulfide, sulfur dioxide, and elemental sulfur to a second condenser heat exchanger. The Claus system includes the second condenser heat exchanger to condense elemental sulfur in the process stream and discharge hydrogen sulfide and sulfur dioxide to a first Claus cycling reactor of multiple Claus cycling reactors. The Claus system includes the multiple Claus cycling reactors each having a second catalyst to convert hydrogen sulfide and sulfur dioxide into elemental sulfur at a temperature below a solidification temperature of the elemental sulfur and deposit the elemental sulfur as solid elemental sulfur on the second catalyst. Each of the multiple Claus cycling reactors have an internal heat exchanger to cool the second catalyst to below the solidification temperature of sulfur.

The details of one or more implementations are set forth in the accompanying drawings and the description below. Other features and advantages will be apparent from the description and drawings, and from the claims.

DETAILED DESCRIPTION

Embodiments of the present techniques are directed to sulfur recovery by converting hydrogen sulfide ($H_2S$) in a reactor via catalyst to elemental sulfur (S), and solidifying the elemental sulfur on the catalyst in the reactor. The solid sulfur may be deposited on the catalyst and on reactor internal surfaces. Certain embodiments may be labeled as sulfur-deposition recovery technology (SDRT). The catalyst is employed to convert the $H_2S$ and sulfur dioxide ($SO_2$) to sulfur. The catalyst may include activated alumina catalyst. The catalyst may include activated aluminum(III) oxide and/or titanium(IV) oxide. Other catalysts are applicable.

Some aspects of the present disclosure are directed to sulfur recovery via a Claus system from feed having $H_2S$. In implementations, the sulfur compounds in the feed may be primarily $H_2S$. In some implementations, the $H_2S$ may be component of acid gas in the feed. In the Claus system, a sulfur recovery efficiency of 99.7+ percent (e.g., 99.8+ or 99.9+ percent) may be achieved without need for a tail gas treatment (TGT) unit. This percent recovery efficiency may refer to the percent of $H_2S$ converted and removed from the feed or refer to the percent of sulfur compounds (including $H_2S$) converted and removed from the feed. The basis may be total sulfur compounds in the feed expressed in terms of equivalent S1 (S1 meaning sulfur compounds with one sulfur atom in a molecule).

The operation may rely on the thermal reaction and the Claus reaction without use of solvent as might be utilized in a TGT unit. In present embodiments, Claus catalytic reactors operate uniquely below the solidification temperature (e.g., melting point) of elemental sulfur, thereby solidifying sulfur on catalyst in the Claus reactors to beneficially giving sulfur recovery of 99.7+ percent in the Claus process without need for a TGT unit to give the 99.7+ percent recovery. Sulfur solidification is generally avoided in other parts (e.g., piping, condensers, etc.) of the Claus system outside of the Claus reactors.

The Claus reactors (e.g., cycling reactors) are regenerated in which the solid sulfur deposited on the catalyst in the reactor is liquefied and ultimately vaporized in the reactor. This vaporized sulfur is condensed in a downstream condenser and recovered. The typical regeneration of these Claus reactors to form sulfur vapor from solid sulfur is a normal operation and not a maintenance activity in response to a system upset or to an abnormal operation.

The present inventor recognized the benefit of allowing Claus cycling sub-dew point reactors to be configured to operate below the solidification temperature of sulfur. The Gamson-Elkins curve (relationship) indicates that colder temperatures favor the Claus reaction. Therefore, rather than simply allowing the sulfur vapor to condense within the reactors (e.g., sub-dew point with liquid sulfur dropping out onto the alumina catalyst), the Claus cycling reactor temperatures herein are adjusted to operate below the sulfur solidification temperature. This generally drives the Claus reaction even further to the right, i.e., favoring the Claus reaction. The low vapor pressure of the solid sulfur may behave as the equivalent of "removing a product," which may also force the reaction further to the right. The solidification of the elemental sulfur on the catalyst (e.g., alumina) in the Claus cycling reactors is an intended and normal operation, and not an unintended or abnormal operation.

The sulfur recovery industry has been using the modified Claus reaction (gas phase reactions), invented in 1936, as the basis for recovering elemental sulfur from hydrogen sulfide ($H_2S$) since the 1940s. The Claus plant, which is the long-standing workhorse of the industry, uses this chemistry to achieve approximately 95 to 98 percent recovery of the $H_2S$ in the acid gas feed as elemental sulfur (gas phase) which is subsequently condensed (i.e., changed from a gas to a liquid) and recovered in the liquid form.

The majority of Claus plants in operation worldwide include a thermal stage (e.g., a free-flame reaction furnace, waste heat boiler, and condenser) followed by either 2 or 3 catalytic stages (e.g., each catalytic stage including a reheater heat exchanger, a catalytic bed in a reactor vessel, and a condenser heat exchanger) that give practicable recovery efficiencies of about 94-96 percent for a 2-stage design (two catalytic stages), or about 97-98 percent for a 3-stage design (three catalytic stages).

In a further effort to improve Claus plant recovery efficiencies, sub-dew point technology was introduced in the 1970s, which allowed sulfur vapor to condense within multiple cycling catalytic beds. The catalyst in the cycling beds is typically alumina. This operation at sub-dew point increased the overall recovery efficiency capability of the SRU from 96-98 percent, to 99.0-99.5 percent.

Due to the negative impact of acid rain in the environment from high levels of $SO_2$ being emitted to the atmosphere from the effluent of the Claus plants (and other industries), the sulfur industry began developing tail gas treatment (TGT) technologies, that are placed immediately downstream of the Claus plant, to further improve the recovery efficiency of the sulfur recovery unit to 99.9+ percent. This 99.9+ percent recovery efficiency can mean that 99.9+% of the $H_2S$ that enters the Claus plant is recovered as elemental sulfur or otherwise removed. The 99.9+ percent recovery efficiency can refer to recovery (liquid sulfur removed/recovered) and not merely to conversion (e.g., percent of $H_2S$ converted to S). The 99.9+ percent recovery efficiency may mean that that 99.9+% of the sulfur compounds that enter the Claus plant are recovered as elemental sulfur or otherwise removed. For the sulfur compounds in the feed stream (e.g., acid gas feed stream) given S1 equivalent basis, then 99.9% of that may be recovered as liquid sulfur.

The most common combination of Claus plant and TGT for achieving 99.9+ percent recovery is a 2-stage Claus plant followed by a reduction absorption amine-based technology. This technology requires the reduction and hydrolysis of sulfur compounds back to the form of $H_2S$, across a catalytic hydrogenation reactor, prior to being processed in a low-pressure amine unit. The $H_2S$ that is absorbed into the amine is then regenerated and sent back to the front end of the Claus plant as a recycle acid gas feed stream. While this is a robust technology, the capital costs and operating costs are high.

Embodiments herein of the Claus system (that converts $H_2S$ into sulfur and recovers the sulfur) include an initial thermal stage having a reaction furnace, waste heat boiler, and condenser heat exchanger. In addition, this Claus system includes multiple Claus catalytic reactors (e.g., at least three Claus catalytic reactors) downstream of the thermal stage. A Claus catalytic reactor is defined herein as a reactor having catalyst that performs the Claus reaction. The catalyst in Claus reactors may be Claus catalyst, which is defined as catalyst that performs, advance, or promotes the Claus reaction. A Claus catalytic reactor may be a reactor vessel having the Claus catalyst inside (in the inner volume of) the reactor vessel.

The first of the Claus catalytic reactors that follows the thermal stage may operate above the dew point (e.g., condensation temperature) of sulfur and be labeled as a Claus converter reactor or Claus converter. In at least some respects, this Claus converter can be considered a typical Claus catalytic reactor operating above the dew point of sulfur. In alternate implementations, there can be more than one of these Claus converter reactors in the present Claus system. The Claus catalytic reactors downstream of the Claus converter may be labeled as Claus cycling reactors because those reactors may participate in a cycle or cycle sequencing. The upstream Claus converter generally does not participate in the cycling.

A Claus converter reactor may be defined herein as a Claus reactor that is not a Claus cycling reactor, and that does not participate in a cycling sequence. Again, the Claus converter reactor when in operation generally continuously operates at an operating temperature above the dew point temperature of elemental sulfur.

A Claus cycling reactor is defined herein as a Claus reactor that participates in a cycle or cycle sequencing with other Claus cycling reactors. As disclosed herein, the Claus cycling reactors may operate below the sulfur solidification temperature. The operation below the sulfur solidification temperature is a normal operation and not an abnormal operation. The number of the Claus cycling catalytic reactors in the Claus system disclosed herein may be, for example, in the range of two to five. In implementations, each Claus cycling reactor may have the same catalyst or same type of catalyst. The catalyst of the upstream Claus converter can be different from, or the same as, the catalyst of the cycling reactors. A Claus reactor, whether a Claus converter reactor or a Claus cycling reactor, is defined herein as a reactor having catalyst to perform the Claus reaction $2H_2S+SO_2 \rightarrow 3S+2H_2O$, in which $H_2S$ gas and $SO_2$ react to give elemental sulfur (S) and water vapor. The catalyst in the reactor as Claus catalyst promotes this Claus reaction.

An oxidation reaction in the thermal stage via the furnace is $2H_2S+3O_2 \rightarrow 2SO_2+2H_2O$, which is the oxidation of the entering $H_2S$ with oxygen ($O_2$) gas to give $SO_2$ and water ($H_2O$) vapor. The aforementioned Claus reaction given above may occur in the thermal stage, as well in Claus reactors (Claus converter and Claus cycling reactors) downstream of the thermal stage. An overall reaction for the Claus system involving these two reaction steps (oxidation reaction and Claus reaction) may be characterized as $2H_2S+O_2 \rightarrow 2S+2H_2O$. By operating at temperatures below the sulfur solidification temperature, the Claus reaction may be urged or forced to the right (toward formation of elemental sulfur and water) allowing relatively high unit-conversion efficiencies to be achieved in the three (or four) cycling reactor beds of catalyst. The number of cycling reactors can vary depending on the particular application. Again, the Claus convertor reactor (e.g., the one Claus reactor that may be labeled as a Claus convertor) that is the first reactor following the thermal stage and upstream of the cycling reactors may operate (e.g., continuously) above the sulfur dew point.

In embodiments, online analyzer instruments may measure composition of the process stream (having sulfur compounds) between the reactors and composition of the Claus tail gas. Feedback from the online analyzer instruments may be utilized for control of the air supply to the upstream thermal-stage combustion.

The flow rate of air (and/or 02) fed to the combustion may be controlled. The ratio (e.g., volume ratio) of the flow rate of air to the flow rate of the process feed (to be combusted) may be controlled to a set point. Sulfur recovery efficiency may decrease if the amount (flow rate) of air fed to the combustion is deficient (deficient air) or in excess (excess air). In implementations, the adjustment (e.g., by a control system) of the air supply rate or the ratio set point of air to feed may be in in response to the amounts (concentrations) of $H_2S$ and $SO_2$ measured in the process stream between the Claus converter and the first cycling reactor. The adjustment of the air supply by the control system may be to maintain or alter the $H_2S:SO_2$ ratio (e.g., 2:1 by volume or weight) in this process stream fed from the Claus converter to the first cycling reactor. In other words, controlling this may give or facilitate optimal (or beneficial) efficiency of sulfur recovery by the Claus system.

The online analyzer instruments may be an online analytical instrument (e.g., online gas chromatograph, online ultra violet (UV)-based analyzer, etc.) disposed along a conduit conveying a process stream between reactors or along a conduit conveying the tail gas discharged from the Claus system, for example, to a thermal oxidizer. The online analyzer instrument may measure composition (of at least some components) of the process stream or tail gas including the concentrations of $H_2S$ and $SO_2$ in the process stream or tail gas. The measured concentrations may be, for example, by weight or volume. The online analyzer instrument (if employed) that measures composition of the tail gas may be labeled as a tail gas analyzer.

In implementations, the tail gas may discharge to a thermal oxidizer (or other incineration or combustion system). The thermal oxidizer may also be labeled as a thermal incinerator. A thermal oxidizer may decompose and combust gas at high temperature. Thermal oxidizers may be a direct-fired thermal oxidizer, regenerative thermal oxidizer (RTO), catalytic oxidizer, and so on.

Various commercialized flue gas desulfurization (FGD) technologies are available to remove remaining $SO_2$ from the stack gas of the thermal oxidizer. In a particular present implementation, an FGD unit treats the combustion (incineration) components (flue gas) discharged from the thermal oxidizer to remove $SO_2$ so that the sulfur recovery efficiency associated with the present Claus system can be at least 99.99%. The FGD may be, for instance, an $SO_2$ scrubbing unit including a scrubber tower (column) vessel. The scrubber tower may have, for example, internals to apply alkaline sorbent, spray nozzles for spraying absorbing or reacting fluid, plates or packed beds of packing for providing contact area between the flue gas and a treatment liquid, and so forth. The treatment of the thermal oxidizer flue gas may involve scrubbing the flue gas via the scrubbing tower with an alkali solid or solution.

Embodiments of the present Claus system (e.g., modified Claus system) may include a thermal section, Claus converter reactor, three to five cycling catalytic reactors, and a thermal oxidizer. The initial thermal section (thermal stage) may include a reaction furnace, waste heat boiler, and first condenser. The Claus converter reactor and the cycling reactors may be reactor vessels each having at least one bed of catalyst. The cycling reactors may operate both at sub-dew point and at sub-solid. A cycling reactors may operate at sub-dew point when moving from the regeneration position as crossing from vapor to liquid and then to solid. For the cycling reactors, sub-dew point is defined herein as operating below the sulfur dew-point temperature but above the sulfur solidification temperature. Sub-solid is operating below the sulfur solidification temperature. These Claus cycling reactors may operate at specific times in the sequence at sub-solid temperatures (e.g., in a range of 105° C. to 112° C.) below the sulfur solidification temperature. In implementations, the cycling reactors may operate generally continuously below the sulfur solidification temperature, except when being regenerated and transitioning from regeneration. In the non-regeneration positions, the cycling reactors can occasionally dynamically vary above sub-solid depending on operation stability. The sulfur solidification temperature is typically in the range of 115° C. to 119° C. The sulfur solidification temperature may be given as a range and not as a specific temperature because, for example, there are three forms of solid sulfur including orthorhombic, amorphous and monoclinic.

Sub-dew point Claus processes allow liquid sulfur to "drop out" (condense) on reactor catalyst and have proved robust and reliable. The present sub-solid implementations in Claus reactors provide for the sulfur to solidify on the reactor catalyst (e.g., alumina catalyst). Cooling coils, cooling (cold) plates, or equivalent, may be employed inside the cycling reactors to localize the cooling (to below the sulfur solidification temperature) in the reactors. Process temperatures in the process piping and process equipment other than the reactors may be maintained above the sulfur solidification temperature to avoid sulfur solidification in equipment outside of the reactor. Thus, solid-sulfur fouling (plugging) generally does not occur (e.g., in piping and process equipment) external to the reactor.

In certain implementations to avoid an $SO_2$ emissions spike from the thermal oxidizer during the switching of cycling reactor positions, the cycling reactor next to the last (final) position may operate at or above a specified minimum temperature (e.g., catalyst bed temperature) (e.g., at least 105° C.) before that cycling reactor is switched into the final position. This may avoid or decreases chances of an $SO_2$ emissions spike in the discharge (exhaust) of the thermal oxidize because the catalyst bed may achieve or approach a desired sulfur recovery efficiency (e.g., 99.9+ percent) with the operating temperature of that cycling reactor at or above the specified minimum temperature (e.g. 105° C.).

In the sequencing of the Claus cycling catalytic reactors downstream of the Claus converter, the sequence "position" of a cycling reactor refers to the operational point of the cycling reactor in the sequence and not to a physical location of the cycling reactor. Similarly, in the sequencing operation, the sequence actions of a cycling reactor being "placed in" a position or "moved to" a position does not mean that the reactor is physically relocated but instead the reactor is assigned that sequence position (and operation of associated valves adjusted). Such may involve physical adjustments of operation of associated valves. For a given sequence position, valve operating positions (e.g., opened or closed) for valves on piping interfacing with the cycling reactor may be altered to give a position.

An example of the switching sequence of the present Claus system with three cycling reactors (arbitrarily labeled Reactor A, Reactor B, and Reactor C) downstream of the Claus converter can be for the sequence positions: Reactor A in first position (e.g., regeneration) moved to the second position; Reactor B moved from second position to third position; Reactor C moved from third position to the first position (e.g., to be regenerated). An example of the switching sequence of the present Claus system with four cycling reactors (arbitrarily labeled Reactor A, Reactor B, Reactor C, and Reactor D) downstream of the Claus converter can be: Reactor A in first position (e.g., regeneration) moved to the second position; Reactor B moved from second position to third position; Reactor C moved from third position to the fourth position; and Reactor D moved from fourth position to the first position (e.g., to be regenerated). In the embodiments with three or four cycling reactors, for regeneration performed at the sequence first position (or other positions), the solid sulfur (that has been deposited in the reactor when in various positions of the sequence) may be liquefied and vaporized by heating (increasing the operating temperature of) the reactor in the first position. This sulfur vapor generated in the regeneration (e.g., in the reactor at the first position) may be condensed in a downstream condenser and recovered. In implementations, hot gas from the Claus converter reactor may be supplied to a cycling reactor to heat that cycling reactor for regeneration.

In implementations, the first position of the sequence is the regeneration position. As mentioned, in the regeneration, liquid and solid sulfur are removed from the reactor (including from the catalyst bed) by heating the reactor including heating the reactor bed. Again, an example heat source for the regeneration is hot process gas from the upstream Claus converter. For the cycling reactor in regeneration, this hot process gas from the Claus converter reactor may be utilized to heat the cycling reactor and its catalyst bed being regenerated.

An alternate configuration and switching sequence for the present modified Claus system may include an isolated (e.g., out-of-the-process loop) reactor that is purged (e.g., with a non-sulfur bearing purge medium) to flush sulfur compounds from the catalyst (e.g., alumina catalyst) before that reactor is placed in the final position. This alternate configuration may employ an additional reactor in the overall configuration (e.g., the fourth or fifth cycling reactor). The cycling reactor (cycling reactor bed) to be purged may come from the first position of the sequence. In other words, the cycling reactor assigned for purging may be the reactor as regenerated when the reactor was in the sequence first position.

As indicated for alternate configurations with a purge position, this cycling reactor as regenerated in the first position may be moved from (assigned from) the first position to the out-of-process purge position. In the purge, the reactor and its catalyst bed may be purged, for example, with steam or an inert gas, such as nitrogen (e.g., high-purity $N_2$, or $N_2$ generally free of $O_2$) as the flushing medium. The purge stream fed to the reactor being purged may be steam or nitrogen generally free of $O_2$ and sulfur compounds. The spent purge stream (having sulfur or sulfur compounds removed from the reactor catalyst) that discharges from the purged reactor may be kept in (returned to) the Claus system so as not to contribute to $SO_2$ emissions. The point of return for the purged stream may be to the front (at the inlet) of the reaction furnace or downstream of the reaction furnace. For example, the spent purge stream may be sent to the front of the SRU (into the reaction furnace), into the Claus converter reactor, or after the Claus converter reactor (before the first Claus cycling reactor).

The cycling-reactor switching sequence for this configuration with a purge position may be: Reactor A in the first position (regeneration), after being regenerated, is taken off-line and purged to remove elemental sulfur vapor and sulfur compounds, such as $H_2S$, $SO_2$, carbonyl sulfide (COS), and carbon disulfide ($CS_2$), from the reactor. Reactor B in the second position may be moved to the first position to be regenerated. Reactor C in the third position may be moved to the second position. The previously purged reactor may be returned to the process in the third and final position.

Thus, in one configuration having a purge position, the present Claus system has four cycling catalytic reactors (arbitrarily labeled Reactor A, Reactor B, Reactor C, and Reactor D) downstream of the Claus converter. Again, the switching sequence may be as follows: Reactor A, after being regenerated in the first position, is taken off-line and placed in (assigned to) purge position to be purged; Reactor B in the second position may be placed in the first position to be regenerated; Reactor C in the third position may be placed in the second position; and Reactor D in purge position may be placed back on-line in the third position (e.g., final position). Generally, only three of the four cycling reactors are in process at a given time. Again, the purge position may be an out-of-process position. This position may be in process in a sense that the spent purge stream may discharge in process. However, this position may be labeled as out-of-process because the entering purge stream is not a process stream, or at least is not the main (primary) process stream being processed.

This example of the sequencing for a configuration with a purge position may be characterized as in a reverse direction compared to sequencing described above for configurations without a purge position. However, sequencing other than the reverse sequence described is applicable for configurations with a purge position, such as sequencing congruent with the forward sequence described for configuration without a purge position. For instance, Reactor A in first position (e.g., regeneration) placed in purge position; Reactor B in purge position placed in second position; Reactor C in second position placed in third position (final position); Reactor D in third position (final) placed in first position (e.g., to be regenerated). However, a benefit of the reverse direction sequence described may be that the freshly purged cycling reactor placed in the final position reduces chance of an $SO_2$ spike in concentration in the tail gas at switching in the sequence.

In another configuration having a purge position and with five cycling reactors, the present Claus system has five cycling catalytic reactors (arbitrarily labeled Reactor A, Reactor B, Reactor C, Reactor D, and Reactor E) downstream of the Claus converter. The switching sequence may be as follows: Reactor A, after being regenerated in the first position, is taken off-line and placed in (assigned to) the purge position to be purged; Reactor B in the second position may be placed in the first position to be regenerated; Reactor C in the third position may be placed in the second position; Reactor D in the fourth position may be placed in the third position; and Reactor E in the purge position may be placed back on-line in the fourth position (e.g., final position). Generally, in this configuration, only four of the five cycling reactors are in process at a given time.

Various sequencing of the configurations with a purge position are applicable. However, as indicated, it may be beneficial to place the purged reactor into the final position, for example, to avoid (or reduce the chance of) $H_2S$ and/or $SO_2$ spikes in the Claus tail gas discharged from the final position.

Figure 1:
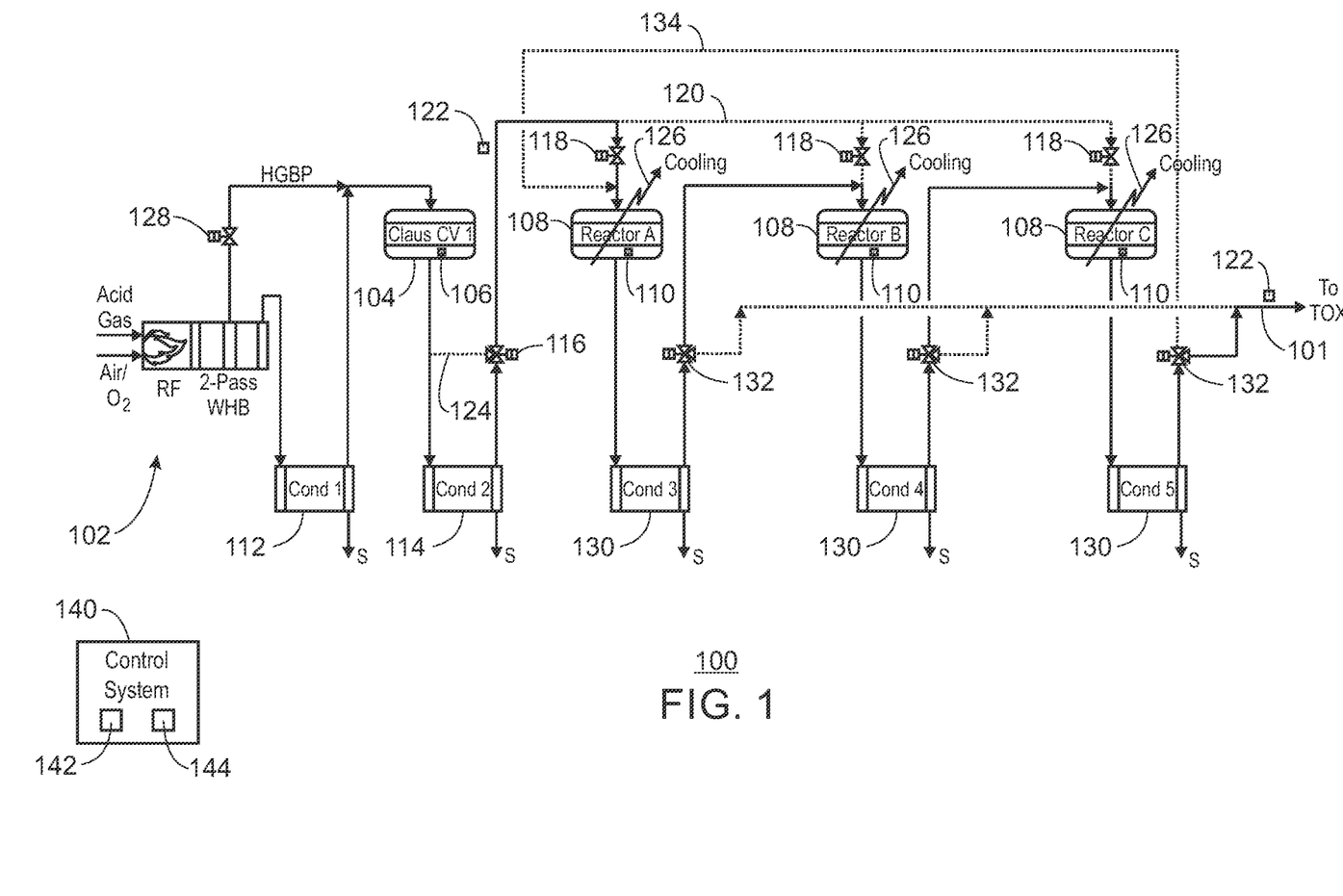
FIG. 1 is a diagram of a Claus system in accordance with embodiments of the present techniques, and which may be example of a sulfur-deposition recovery technology (SDRT) system.

FIG. 1 is a Claus system 100 in accordance with embodiments of the present techniques, and which may be examples of the SDRT process. In implementations, the Claus system 100 does not include a reheater heat exchanger (e.g., shell-and-tube), such as those typically found in conventional Claus systems. In implementations of system 100, the Claus reactor stages can operate with a reheater heat exchanger.

The Claus system 100 receives feed (e.g., acid gas) having $H_2S$ and recovers 99.7+% of the $H_2S$ as elemental sulfur. The Claus system 100 converts the $H_2S$ into elemental sulfur that is recovered and collected. The Claus system 100 discharges a residual process stream (e.g., labeled as Claus tail gas 101) having residual sulfur compounds that may be sent, for example, to a thermal oxidizer. The Claus system 100 utilizes a Claus thermal stage 102, Claus converter reactor 104 having catalyst 106, and multiple Claus cycling reactors 108. The Claus cycling reactors 108 operate sub-solid and are internally cooled, and each having catalyst 110. In operation, the internal cooling in the cycling reactors 108 allows (provides for) solid sulfur to "drop out" (deposit) onto the catalyst 110 (e.g., alumina catalyst, alumina-titania catalyst, etc.) in the reactors 108. This technology of the Claus system 100 and associated operation may allow for (provide for or give) overall sulfur recovery efficiencies of 99.7+ percent or 99.8+ percent to be achieved without need of a TGT unit.

An innovative basis of this present technology disclosed herein is to allow solid sulfur to be formed in the cycling reactors 108. Conventional sub-dew point technologies allow for liquefaction (not solidification) of sulfur to occur in the cycling sub-dew point reactors. In contrast, here, by allowing the sulfur produced from the Claus reaction to go from the gas phase to the solid phase over the catalyst 110, the Claus reaction is forced even further to the right compared to the extent of Claus reaction in the sub-dew point process. The well-known Gamson-Elkins curve shows that colder temperatures favor the Claus reaction. In addition, due to the very low vapor pressure of solid sulfur, the solidification of the sulfur vapor over the catalyst 110 may have the effect of sulfur product removal from the gas-phase Claus reaction, which can drive the Claus reaction further to the right.

The catalyst 106, 110 may include aluminum or titanium for both. The catalyst 106, 110 may be, for example, alumina [aluminum oxide ($Al_2O_3$)] (or bauxite), titania [titanium dioxide ($TiO_2$)], a combination of alumina and titania, or other Claus catalysts. The alumina may be a porous alumina. The alumina may be activated alumina that is porous and having an increased ratio of surface-area-to-weight.

The catalyst 106 in the Claus converter 104 may be the same or different as the catalyst 110 in the Claus cycling reactors 108. In examples, the catalyst 110 is alumina and the catalyst 106 is titania or a combination of alumina and titania. In examples, the catalyst 110 is alumina and the catalyst 106 is at least 70 volume percent (vol %) titania. In examples, the catalyst 110 is alumina and the catalyst 106 is titania with 0 vol % to 30 vol % of alumina, or with 5 vol % to 50 vol % of alumina. The catalyst 106 may be titania at 70 vol % to 100 vol % with alumina at 0 vol % to 30 vol %. The catalyst 106 may be titania at 50 vol % to 95 vol % with alumina at 5 vol % to 50 vol %.

The thermal stage 102 (thermal section) includes a reaction furnace (e.g., free-flame furnace), a waste heat boiler (e.g., a 2-pass waste heat boiler as shown) and a first condenser heat exchanger 112 (e.g., shell-and-tube heat exchanger). As appreciated by one of ordinary skill in the art, a reaction furnace typically has a burner or is associated with a burner. In the illustrated embodiment, the waste heat boiler is coupled to the reaction furnace and is depicted as a 2-pass waste heat boiler (2-pass WHB). In operation, an oxidation reaction in the furnace is $2H_2S+3O_2 \rightarrow 2SO_2+2H_2O$. The Claus reaction ($2H_2S+SO_2 \rightarrow 3S+2H_2O$) occurs in the furnace and in the reactors 104, 108. Other reactions in the thermal stage 102 may include $2H_2S \rightarrow S_2+2H_2$, in which disulfur ($S_2$) and hydrogen $H_2$ are formed; $CH_4+2H_2O \rightarrow CO_2+4H_2$, in which methane ($CH_4$) is consumed and carbon dioxide ($CO_2$) is formed; $H_2S+CO_2 \rightarrow S=C=O+H_2O$, in which carbonyl sulfide ($S=C=O$) is formed; and $CH_4+2S_2 \rightarrow S=C=S+2H_2S$, in which carbon disulfide ($S=C=S$) is formed. The thermal stage 102 may also include a first condenser heat exchanger 112 that condenses elemental sulfur in the primary process stream discharged from the waste heat boiler. The condensed elemental sulfur (S) may be recovered and collected. The process stream (minus the removed condensed sulfur) may be fed from the first condenser heat exchanger 112 to the Claus reactor 104.

The Claus system 100 may typically have one Claus reactor 104 (as depicted) that operates above the sulfur dew point and which may be labeled as a Claus converter reactor or a Claus converter. The Claus system 100 can have more than one such Claus converter reactor 104. This converter stage may have a second condenser heat exchanger 114 (associated with the Claus converter reactor 104) that condenses elemental sulfur discharged from the Claus converter reactor 104. The elemental sulfur (S) condensed by the second condenser 114 may be recovered and collected. In the illustrated embodiment, a process stream having sulfur components (minus the condensed sulfur removed via condenser 114) flows from the second condenser heat exchanger 114 through the 3-way valve 116 to the Claus cycling reactor 108 (Reactor A) operating in the first position of the cycle. The process stream flows through the valve 118 at the inlet of the Claus cycling reactor 108 (Reactor A). As indicated by reference numeral 120, the cycling reactor 108 (Reactor B) (second operating position) may be placed in the first operating position by closing the valve 118 at the inlet of the cycling reactor 108 (Reactor A) and opening the valve 118 at the inlet of the cycling reactor 108 (Reactor B).

In implementations, an online analytical instrument 122 may be disposed along the conduit conveying the process stream to the cycling reactor 108 operating in the first position to measure, for example, the amounts or concentrations of $H_2S$ and $SO_2$ in the process stream. Such measurements may be utilized by a control system (e.g., control system 140) as feedback for specifying the amount (e.g., amount per unit time) of air fed to the reaction furnace of the thermal stage 102.

For the time or period the Claus cycling reactor 108 in the operational first position of the cycle is subjected to regeneration, the process stream discharged from the upstream Claus converter reactor 104 may bypass the second condenser 114 through a bypass conduit 124 via the 3-way valve 116 so that the process stream is hotter entering the Claus cycling reactor 108 in the operational first position. In other words, the process stream (having hydrogen sulfide, sulfur dioxide, and elemental sulfur vapor) discharged from the Claus converter 104 may be diverted from the condenser heat exchanger 130 (Cond 3) to the Claus cycling reactor 108 (Reactor A) in the first position to heat that reactor 108 for regeneration. The cooling 126 in the Claus cycling reactor 108 (Reactor A) may be stopped during regeneration of that reactor 108. The heating (regeneration) may form elemental sulfur vapor from the solid elemental sulfur vapor deposited on the catalyst 110, which can be condensed in the downstream condenser 130 (Cond 3).

The Claus reactors 104, 108 and their respective associated condenser 114, 130 (e.g., shell-and-tube heat exchangers) may be characterized or labeled as Claus reactor stages. For instance, the Claus converter reactor stage may include the Claus converter reactor 104 and the condenser heat exchanger 114. In the illustrated embodiment, three Claus cycling reactor stages are depicted. The first Claus cycling reactor stage includes the first Claus cycling reactor 108 (Reactor A) and the third condenser 130 (Cond 3). The second Claus cycling reactor stage includes the second Claus cycling reactor 108 (Reactor B) and the fourth condenser 130 (Cond 4). The third Claus cycling reactor stage includes the third Claus cycling reactor 108 (Reactor C) and the fifth condenser 130 (Cond 5).

The Claus system 100 can have three Claus cycling reactors 108, as depicted. The illustrated cycle sequencing is given as an example. The associated valve arrangements indicate the operational position of a reactor 108 in the sequence. The Claus cycling reactor 108 (Reactor A) is depicted as in the operational first position of the cycle sequence. The Claus cycling reactor 108 (Reactor B) is depicted as in the operational second position of the cycle sequence. The Claus cycling reactor 108 (Reactor C) is depicted as in the third operational position (final position) of the cycle sequence.

When the cycling reactor 108 in the regeneration position is moved to the second position as Reactor B, there may initially be sulfur vapor discharged from the cycling reactor 108 (Reactor B) before liquefaction of the sulfur, and before solidification of the sulfur reaches steady state in the cycling reactor 108 (Reactor B). This sulfur vapor may be condensed in the condenser heat exchanger 130 (Cond 4). Then, after steady state sub-solid operation of the cycling reactor 108 (Reactor B) is established, the process stream (with little or no sulfur vapor) discharged from the cycling reactor 108 (Reactor B) may continue to be routed through condenser heat exchanger 130 (Cond 4). Such may be implemented for operational simplicity and to account for dynamic instability or upsets that may occur in the cycling reactor 108 (Reactor B) in which Reactor B may go temporarily above sub-solid.

Likewise, for cycling reactor 108 (Reactor C) in the third (final) operating position, in steady state there may be little or no sulfur vapor discharged from Reactor C and therefore little or no sulfur vapor condensed in the condenser heat exchanger 130 (Cond 5). Instead, the sulfur is solidified in Reactor C and dropped out as solid on the catalyst 110 (and potentially on reactor internal surfaces). However, the process stream (with little or no sulfur vapor) discharged from the cycling reactor 108 (Reactor C) may nevertheless be routed through condenser heat exchanger 130 (Cond 5) to account for dynamic variation or upsets when sulfur vapor or liquid may discharge from Reactor C.

The Claus system 100 can have more than three Claus cycling reactors 108. For instance, the Claus system can have a fourth Claus cycling reactor (Reactor D) (not shown) that would be in a fourth operational position as the final position. Moreover, the Claus system 100 can have an additional Claus cycling reactor 108 to accommodate an out-of-process purge position. The phrase "out-of-process" for this purge position may be defined herein as not receiving the main (primary) process stream flowing from reactor to reactor in the operating sequencing.

The Claus convertor reactor 104 may be a fixed-bed reactor that is a reactor vessel having at least one bed of the catalyst 106. Likewise, the Claus cycling reactors 108 may each be a fixed-bed reactor that is a reactor vessel having at least one bed of the catalyst 110. The fixed-bed reactor may be a tubular fixed-bed reactor. In some implementations, the reactors 104, 108 may be fluidized bed reactors in which the reactors 104, 108 operate with fluidized bed of the catalyst 106, 110.

The reactor vessels may be cylindrical vessels having elliptical heads, and having a horizontal or vertical orientation. The reactors vessels may have nozzles, e.g., for flanged or screwed connections to inlet and outlet conduits, for instrumentation, and so forth. The process stream having the sulfur components may enter one end of the reactor vessel to flow through the catalyst bed, and discharge from the other end of the reactor vessel. The vessel 204 may be a pressure vessel.

The reactor vessels may be a pressure vessel designed and configured (e.g., with adequate wall thickness) to be subjected to an internal pressure up to a specified pressure (design pressure) greater than ambient pressure (atmospheric pressure). A pressure vessel may be rated to hold a fluid up to the design pressure. In operation, the operating pressure in a pressure vessel may generally be maintained less than the design pressure. A pressure vessel may be constructed per a formal standard or code, such as the American Society of Mechanical Engineers (ASME) Boiler & Pressure Vessel Code (BPVC) or the European Union (EU) Pressure Equipment Directive (PED).

The operating temperature of the reactors 104, 108 may be the temperature of the catalyst and/or fluid in the reactor vessel. The operating temperature of the reactors 104, 108 may be measured by a temperature sensor(s) (not shown) at the inlet portion of the reactor vessel, in the catalyst (e.g., multiple strategic points and depths in the catalyst), an outlet portion of the reactor vessel, and/or outlet conduit from the reactor vessel. The temperature sensor(s) may be thermocouple (e.g., in a thermowell) or a resistance temperature detector (RTD), and the like.

In the illustrated embodiment, the operating temperature of the Claus converter reactor 104 may be controlled by adjusting the open percentage of the control valve 128. The control valve 128 may adjust the flow rate of the hot gas bypass (HGBP) from the waste heat boiler (WHB) of the thermal stage 102 to the Claus converter reactor 104. The HGBP may be from the first pass of the WHB as a 2 pass WHB. In one example, the control valve 128 is a butterfly valve. In implementations, the control valve 128 may be have a jacket for a heating medium, such as steam.

The cycling reactors 108 may each have an internal heat exchanger (as represented by the cooling 126 arrow) to cool the fluid and catalyst in the reactor 108. The internal heat exchanger may be a heat exchanger internal to the reactor 108. The reactor internal heat exchanger may be, for example, cooling coils or cooling plates (cold plates) disposed in the inside volume of the reactor vessel in (and/or around) the catalyst 110 bed. The cooling medium for the reactor internal heat exchanger may be water, such as boiler feedwater, steam condensate, demineralized water, or cooling tower water. In implementations, the operating temperature of the Claus cycling reactors 108 may be controlled by adjusting the flow rate of the cooling medium through the reactor internal heat exchanger(s). The operating temperature of the cycling reactors 108 may be, for example, in the range of 105° C. to 114° C., which is below the sulfur solidification temperature (typically 115° C. to 119° C.) of sulfur but above water condensation temperature (e.g., 100° C.). The operating temperature of the cycling reactors 108 may be maintain below the solidification temperature of sulfur via the internal heat exchanger cooling the catalyst 110 and/or process gas stream(s) flowing through the cycling reactors 108. The cooling takes place within the cycling reactors 108 so to avoid solidification in equipment, process piping, switching valves, etc. outside of the reactors 108. Process gas temperatures below the sulfur solidification temperature (e.g., 115° C. to 119° C.) upstream and between the sub-solid Claus cycling reactors 108 may result in the formation of solid sulfur in piping, condensers, coolers, etc. that could plug the system 100 and cause corrosion. Cooling, therefore, may take place within the reactors 108, for example, via the aforementioned indirect cooling coils or plates that can be placed at multiple levels within the depth of the catalyst 110. The depth of the catalyst 110 bed may be, for example, at least 4 feet. The depth of catalyst and space velocity implemented may be varied depending on the demands of the sulfur recovery.

Each cycling reactor 108 stage may have a respective condenser heat exchanger 130 that condenses elemental sulfur discharged from the Claus cycling reactor 108. The elemental sulfur (S) condensed by the condensers 130 may be recovered and collected. A process stream having sulfur components (minus the removed condensed sulfur) flows from the respective condenser 130 to the cycling reactor 108 assigned for that cycle at the next operational position. For instance, the condenser 130 (Cond 3) associated with the cycling reactor 108 (Reactor A depicted in the first operational position) discharges the process stream via a respective 3-way control valve 132 to the cycling reactor 108 (Reactor B) depicted as in the second operational position of the cycle. The condenser 130 (Cond 5) associated with the cycling reactor 108 (Reactor C) in the operational third (final) position of the cycle may discharge the process stream as the tail gas 101 to the thermal oxidizer, as per the depicted operating position of the respective 3-way valve 132.

In implementations, for the next sequence (not depicted) of the cycle, the cycling reactor 108 (Reactor C) may be moved to the operating first position by altering the operating position of the valve 132 associated with reactor 108 (Reactor C) to route the process stream from the condenser 130 (Cond 5) associated with the reactor 108 (Reactor C) to the reactor 108 (Reactor A), as indicated by reference numeral 134. Further, the valve 118 at the inlet of the cycling reactor 108 (Reactor C) may be opened to place the cycling reactor 108 (Reactor C) reactor into the first operating position.

The condenser heat exchangers 112, 114, 130 in the Claus system 100 may each be, for example, a shell-and-tube heat exchanger, and in which water is the cooling medium. Other heat exchanger types and cooling mediums are applicable.

An example of the cycle sequence is: Reactor A in first operating position placed in the second operating position; Reactor B in second operating position placed in third operating position (final operating position); and Reactor C in third operating position (final operating position) placed in first position. Regeneration of the cycling reactor 108 may be implemented in the first operating position. The regeneration may involve volatizing the solidified sulfur in the cycling reactor and discharging the sulfur vapor from the cycling reactor 108.

Hydrogen sulfide may be fed to the reaction furnace (RF) of the thermal stage. Acid gas having the $H_2S$ may be fed to the reaction furnace. The acid gas may additionally have $CO_2$ and other components. Oxygen gas may be fed to the reaction furnace. Air may be introduced to the reaction furnace. The flow rate of the $O_2$ or air may be adjusted via a control valve disposed along a conduit conveying the $O_2$ or air. The air may be labeled as combustion air. Fuel gas may also be provided to the reaction furnace.

A control scheme for the combustion air may include ratio control of the flow rate of combustion air to the flow rate of the acid gas. A user may input a set point into a control system for the desired ratio (e.g., volumetric ratio) of air to acid gas fed to the reaction furnace. A flow meter along the conduit conveying the combustion air to the reaction furnace may measure the flow rate of air, and indicate via an instrument transmitter to the control system the flow rate (e.g., volumetric) of the combustion air. A flow meter along the conduit conveying the acid gas to the reaction furnace may measure the flow rate of acid gas, and indicate via an instrument transmitter to the control system the flow rate (e.g., volumetric) of the acid gas. The control system may adjust the flow rate of the air via the aforementioned control valve to maintain the ratio of air to acid gas at set point. In some implementations, the control system may rely on operational feedback from the Claus system to alter the set point of the ratio. In embodiments, the aforementioned control valve is labeled as the main air valve, and the system additionally includes a trim air control valve on the air supply. The trim air valve may be along the air supply line adjacent (e.g., as a bypass) to the main valve, or the trim air valve may be on a separate air supply line. Both the main and trim valves may receive air supply from the same air source, e.g., air blower(s). In implementations, the smaller trim air supply line (conduit) branches off the main air supply line (conduit) and may be configured as a relatively small bypass around the main air valve. Both may have meters to measure their respective air flow rate, and the combined flow may represent the total air flow to the reaction furnace. The trim air valve (if employed) may provide, for example, less than 10% of the total air fed to the reaction furnace, whereas the main air valve may provide at least 90% of the total air supplied to the furnace. The control system may specify the air flow-rate set point of the trim air valve based on operational feedback from the Claus system.

Operational feedback may include composition of process streams having sulfur compounds. In certain implementations, the Claus system 100 includes the online analytical instrument 122 situated along a conduit conveying a process stream having sulfur compounds (from the Claus converter 104) to the Claus cycling reactor 108 in operation in the first position of the cycle. In some examples, the online instrument 122 measures the amount or concentration of components (e.g., $H_2S$ and $SO_2$) in the process stream. The online analytical instrument 122 may be, for example, an online UV-based analyzer that measures concentration of $H_2S$ and $SO_2$ in the process stream flowing to the reactor 108 in the first position. Another such online analytical instrument 122 may be disposed along the conduit conveying the Claus tail gas 101 to measure concentration of $H_2S$ and $SO_2$ in the tail gas 101. The Claus system 100 can include additional online analytical instruments 122 disposed on other process streams containing sulfur compounds.

The component concentrations (e.g., for $H_2S$ and $SO_2$) measure by the online analytical instrument may be indicated via an instrument transmitter to the control system. In other words, the instrument transmitter may send a signal indicative of the component concentrations (or amounts) to the control system (e.g., control system 140). The control system based on the concentration of $H_2S$ and/or $SO_2$ measured by one or more of the online analytical instruments 122 may adjust, for example, the set point of the air to acid gas ratio or the flow-rate set point of the air trim control valve, and the like. Fine-tuning of the flow rate of the combustion air may be beneficial to obtain and maintain the desired overall sulfur recovery efficiency of the Claus system 100.

The reaction furnace may be a significant part of the sulfur recovery unit because the reaction furnace may not only convert a relatively large portion of the conversion of the entering $H_2S$ to elemental sulfur, but also destroy contaminants that enter in the acid gas feed stream(s). These contaminants may include hydrocarbons, BTEX (benzene, toluene, ethyl benzene, and xylenes), methanol, mercaptans, ammonia ($NH_3$), and so on. If these contaminants are not destroyed in the reaction furnace, the contaminants may negatively affect the purity of the sulfur product, cause problems in the downstream units, and possibly ultimately be emitted to the atmosphere (the environment). To facilitate destruction of the acid-gas feed-stream contaminants, the reaction furnace may be configured to operate at a temperature, for example, of at least 1050° C. (e.g., in the range of 1050° C. to 1250° C.) in cases in which $NH_3$ is not present, such as at a sour gas plant, or at least 1250° C. (e.g., in the range of 1250° C. to 1450° C.) in cases in which $NH_3$ is present, such as at a petroleum refinery. To accomplish this, a combination of acid gas preheating, air preheating, oxygen enrichment, fuel gas co-firing, and so forth, may be implemented and may be dependent on the level of $H_2S$ in the acid gas feed stream(s). The streams that may enter the reaction furnace (e.g., an SDRT reaction furnace) of the thermal stage 102 may therefore be acid gas feed stream(s), combustion air and/or enriched or pure oxygen, and if beneficial, fuel gas for co-firing.

The Claus reaction may take place in the reaction furnace converting, for example, approximately 50-70 percent of the sulfur bearing compounds entering the reaction furnace into elemental sulfur. As discussed, a waste heat boiler (e.g., two-pass WHB) may be attached to the reaction furnace to reclaim the bulk of the heat and reduce the process gas temperature (e.g., in the range of 1050° C. to 1350° C. as discharged from the furnace) to less than 600° C., such as in the range of 300° C. to 600° C. For the WHB as a two-pass WHB, the process gas may be cooled, for example, to less than 600° C. (e.g., in the range of 500° C. to 600° C.) by the first pass and to less than 340° C. (e.g., in the range of 300° C. to 340° C. by the second pass. This may be accomplished in a heat exchanger of the WHB, such as a shell-and-tube exchanger.

Figure 1A:
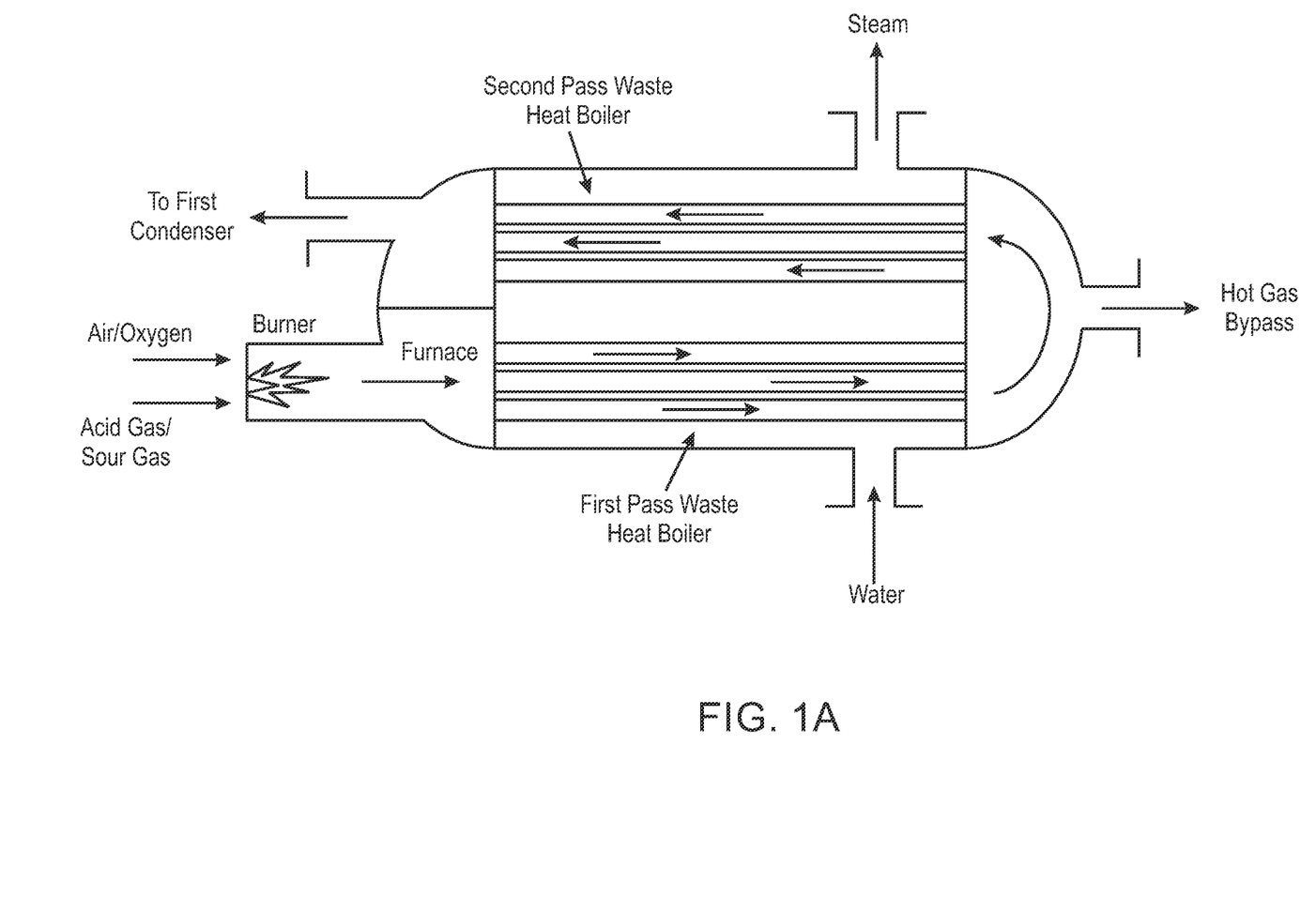
FIG. 1A is a diagram of a 2-pass waste heat boiler (WHB) that may be an example of the WHB in FIG. 1.

FIG. 1A is an example of a 2-pass WHB (with burner of upstream reaction furnace) that may be employed in the thermal stage 201. The WHB as two pass may mean that the first pass and second pass are the shell-and-tube heat exchanger. The first pass and second pass may share the same shell and boiler feedwater (BFW) flowing through the shell, but there are two different sets of tubes. For instance, the first pass is the tubes with BFW flowing in the direction from the reaction furnace to the WHB end, and the second pass is the tubes with BFW flowing in the direction from the WHB end toward the reaction furnace.

In the WHB heat exchanger, heat may transferred from the discharge stream of the reaction furnace (which is the process stream) to water as the cooling medium to vaporize the water to generate the steam. The water may be, for example, BFW, demineralized water, or steam condensate. The steam generated may be, for example, at least 50 pounds per square inch gauge (psig), at least 150 psig, or at least 600 psig, or in the ranges of 50 to 900 psig, 600 psig to 900 psig, 150 psig to 600 psig, or 50 psig to 600 psig, and the like. The steam may be saturated steam.

Returning to FIG. 1, following the WHB may be the condenser 112 (Cond 1) (first condenser) that further reduces the process gas temperature, for example, to less than 150° C. (e.g., in the range of 100° C. to 150° C., or in the range of 125° C. and 150° C.) for the condensation, collection, and removal of liquid elemental sulfur from the process stream. The cooling medium for the condenser 112 (Cond 1) may be, for example, boiler feedwater, demineralized water, or steam condensate. Therefore, the condenser 112 (Cond 1) may be utilized to generate steam (e.g., 50 psig saturated steam).

The process stream (process gas) leaving the first condenser 112 (Cond 1) may be "reheated" in route to the first catalytic converter (Claus converter reactor 104) to facilitate that the elemental sulfur produced by and in the catalyst 106 remains in the vapor phase. As discussed, this may be accomplished via provision of a stream (slipstream) from the first pass of the WHB mixing with the outlet process stream from the first condenser 112 (Cond 1). This type of "process" reheater may be referred to as a Hot Gas Bypass (HGB or HGBP) and is not a reheater heat exchanger but instead the tie-in of one conduit to another conduit, such as via pipe tee. In implementations, the Claus system 100 does not include a stage reheater heat exchanger in the stages of the Claus catalytic reactors 104, 108. This slipstream may be controlled via the control valve 128. The control valve 128 may provide for temperature control of the first Claus catalytic reactor (Claus converter 104). The control valve 128 may be a steam jacketed valve. In a particular implementation, the control valve 128 is a triple-offset steam-jacketed butterfly valve.

To advance an overall sulfur recovery efficiency of 99.7+ percent for the Claus system 100, conversion of 99+ percent of the COS and $CS_2$ formed in the reaction furnace (via unwanted side reactions) back to (hydrolyzed back to) $H_2S$ may be beneficial. In implementations, this can be accomplished by utilizing the catalyst 106 as full titania catalyst or titania catalyst with a minority volume percentage of alumina (e.g., 70% to 100% titania by volume, balance alumina) and by operating the Claus converter reactor 104 with a bottom bed temperature of the catalyst less than 360° C. (e.g., or less than 340° C., or in a range of 340° C. to 360° C.). In implementations, the process stream enters the top of the catalyst bed and discharges from the bottom of the catalyst bed. After the Claus converter reactor 104 and second condenser 114, the cumulative sulfur recovery efficiency may be in the range of 85% to 92% in certain implementations.

The Claus cycling reactor 108 (Reactor A) of the three (or four) Claus cycling reactors 108 (cycling sub-solid reactor beds) is depicted in the first position. The first position may be a regeneration position that utilizes the hot process gas stream from the outlet of the Claus converter reactor 104 in the regeneration to vaporize the solid and liquid sulfur deposited in and on the catalyst 110, which is then recovered via the condenser 130 (Cond 3) immediately downstream, as discussed. The heat for the regeneration of this reactor 108 may be obtained via a bypass conduit 124 (by operation of a control valve 116) of the process gas from the outlet of the Claus converter reactor 104 around the second condenser 114. This control valve 116 (e.g., 3-way control valve) may be a steam-jacketed control valve for reliability. In some implementations, Reactor B may not operate sub-solid while Reactor A is in regeneration (or for a portion of the time that Reactor B is in regeneration) for instances with relatively higher temperatures of the process stream from Cond 3 fed to Reactor B.

In certain implementations, once the third condenser 130 (Cond 3) immediately downstream of the cycling reactor 108 (Reactor A) reaches a specified flow rate or cumulative amount or liquid sulfur (S) discharged from the condenser 130 (Cond 3), regeneration of the Claus cycling reactor 108 (Reactor A) can be considered complete, and the first reactor can then go into a "pre-cool" action. This may be accomplished by closing the bypass 3-way valve 116 to bypass conduit 124 flow around the second condenser, allowing the process gas from the outlet of the Claus converter reactor 104 to flow through the second condenser 114 before being processed through the Claus cycling reactor 108 (Reactor A) in the first position of the cycle.

The process gas from the Claus cycling reactor 108 (Reactor A) in the first position of the cycle may be cooled to less than 150° C. (e.g., in range of 125° C. to 150° C.) so that the Claus cycling reactor 108 (Reactor B) in the second position of the cycle can operate at sub-dew point temperatures, e.g., allow sulfur vapor to condense as liquid sulfur onto the catalyst 110 in Reactor B. This can be achieved via the condenser heat exhanger 130 (Cond 3) as a single closed-loop condenser (low-low pressure 15-psig steam), a condenser that produces 50 psig saturated steam, or a combination of 50-psig steam producing condenser and a trim cooler. This description of the condenser heat exchanger 130 (Cond 3) may be same for Cond 4 and Cond 5.

At the same or similar time, the internal heat exchanger (e.g., cooling coils, cooling plates, etc.) in the Claus cycling reactor 108 (Reactor B) in the second position may be activated in that cooling medium may begin to flow (e.g., circulate) through the internal heat exchanger for removing heat to reduce catalyst 110 bed temperature in the Claus cycling reactor 108 (Reactor B). Due to the extent of the Claus reaction in this reactor position (e.g., relatively large heat of reaction), the internal heat exchanger (e.g., cooling coils) may not be able to achieve sub-solid bed temperatures during the regeneration step of the first reactor (Reactor A).

Thus, during the high-temperature regeneration action of Reactor A, condensation of elemental sulfur may occur (but generally not solidification of elemental sulfur) in the Reactor B. However, during the Reactor A pre-cool action, Reactor A may achieve higher Claus reaction conversions (thus, Reactor B may subsequently have a lower exotherm from the Claus reaction), and the Reactor B bed temperature may drop below sulfur solidification temperature. Whether there is liquid sulfur, solid sulfur, or a combination of both, in Reactor B, there is sufficient heat available during the regeneration cycle when Reactor B is placed in the first position of cycle to remove liquid and solid sulfur from the catalyst 110 in Reactor B, once the second reactor is moved into the first reactor position for regeneration. In implementations, over 99% cumulative sulfur recovery efficiency may be achieved by the outlet of the fourth condenser 130 (Cond 4) (Reactor B stage).

The process gas from the Claus cycling reactor 108 (Reactor B) may be cooled to about 125° C. or less via Cond 4 and continue to the Claus cycling reactor 108 (Reactor C)

in the third position of the cycle for the sub-solid Claus reaction to take place in Reactor C. The operating temperature of 125° C. or less for a condenser is typically employed in the final condenser (Cond 4) in the Claus process. Cond 4 (and upstream condensers) may be configured for an operating temperature of 125° C. or less (instead of higher) to give additional cooling through the Claus process. Temperatures, for example, in the range of 105° C. to 115° C. may be achieved via internal cooling by the internal heat exchanger in Reactor C to advance (increase) overall recovery efficiency while facilitating that water vapor does not condense in the Reactor C. Condensation of water has the potential of damaging the catalyst 110. The presence of liquid water may allow for the formation of acid, which could be detrimental to the catalyst 110 and reactor 108 materials. The process gas leaving the Claus cycling reactor 108 (Reactor C) in the third position may have minimal (or zero) sulfur vapor due to a sulfur vapor depression effect from the catalyst 110 (e.g., alumina catalyst) that has been observed in sub-dew point units.

Implementations for the catalyst 110 bed temperature in Reactor C in the range of 115° C. to 125° C., liquid sulfur (and generally not solid sulfur) may be deposited on the Reactor C catalyst 110, and thus 99.7+ percent sulfur recovery efficiencies for the Claus system 100 may not be achieved by this third reactor stage position in certain examples. In examples, the Reactor C cooling coils may not ensure that the temperature is 105° C. to 115° C. in Reactor C. If this is the case, the Claus system 100 may include a fourth cycling reactor 108 (Reactor D) for a fourth position in the cycle to promote temperatures in the range of 105° C. to 115° C. for the catalyst 110 in the Reactor D.

Care may be taken such that overloading of the reactors 108 with liquid and solid sulfur does not occur. For example, a rule of thumb can be that 30% loading of sulfur (e.g., 30% of weight of total amount of catalyst 110 in a given reactor 108) is a threshold allowable loading before bed switching takes place. Higher loading may result in crushing of the catalyst (e.g., alumina) beads. If switching sequences give too much of an emissions "spike" during the switching of the beds, or if the reactors are too loaded with sulfur by the time a cycling reactor reaches the final position, an additional process configuration and switching sequence involving a purge position as an embodiment can be implemented.

As embodiment of a Claus sulfur recovery system 100 configuration and associated switching sequence that can be implemented involves the aforementioned purge position. As discussed, the Claus system can have the depicted three cycling reactors 108 for three respective process positions in the cycle and include an additional cycling reactor 108 to accommodate an out-of-process purge position. Such may involve: (x) the Claus cycling catalytic reactor 108 in the first position of the cycle after being regenerated, proceeds through pre-cool action; (y) this cycling reactor 108 in the first position is then removed from the process, and nitrogen (e.g., high purity nitrogen) or steam is utilized as purge gas to purge sulfur vapor and sulfur compounds from the catalyst 110 bed; (z) the outlet purge stream from this bed (reactor) may be returned to the system normal process flow, as discussed, so that the sulfur can be recovered; and (w) once this bed has been purged (flushed) of sulfur vapor and sulfur compounds, this Claus cycling catalytic reactor 108 may be cooled to between 105° C. and 115° C., in preparation to be put in service at the third (last) position of the Claus cycling catalytic reactors 108. This final position stage in the Claus system 100 discharges the tail gas 101 from the last condenser 130 (Cond 5).

When the regenerated bed of the reactor 108 is ready to come back into service, the regenerated reactor 108 is moved from the first position to the purge position, the reactor 108 in the third position is moved to the second position the reactor 108 in the second position is moved in the first position (regeneration), and as indicated, the reactor in the regeneration position will be taken off line for purging. This sequence may be characterized as a generally reverse switching sequence than example configurations discussed without a purge position. This reverse sequence has the advantage that the cycling reactor 108 (catalyst 110 bed) placed in the final position may be empty or unloaded when it begins its service in this final position. This is contrary to certain examples of the sequencing discussed without a purge position in that the cycling reactor 108 (catalyst 110 bed) is partially loaded by the time it moves into the final position (e.g., moving from the second position to the third and final position). While there may be benefits in the switching sequencing (unloaded reactor 108 placed in final position) with configurations having a purge position, such configurations could increase cost and operational complexity in implementing an additional cycling reactor 108 (for a purge position) and a relatively large flow rate of nitrogen or steam for flushing.

As mentioned, 99.99+% sulfur recovery efficiency can be achieved with a FGD (e.g., $SO_2$ scrubbing unit) incorporated in the Claus system 100 to scrub the thermal oxidizer flue gas. Again, commercialized FGD technologies are available to remove $SO_2$ from the stack gas of the thermal oxidizer.

The Claus process may implement a stoichiometric ratio of 2:1 for $H_2S:SO_2$ for conversion. Therefore, the Claus system 100 may include a tail gas analyzer 122 at the outlet of the second condenser 114 [and on the tail gas 101 after the last (final) position of the cycling reactors] for measuring these components $H_2S$ and $SO_2$. The Claus system 100 may utilize this information as a feedback control loop to the front end of the reaction furnace to control the flow rate of combustion air and/or oxygen. The tail gas analyzer(s) 122 may be utilized for feedback in fine-tuning the combustion air to the reaction furnace in the thermal stage 102.

The sub-solid reactors 108 and associated condensers 130 are separated by switching valves that allow the reactors 108 to change positions in the process. This is an aspect of the sub-solid Claus process because the adsorption and regeneration of the sub-solid reactors may be a batch process. In implementations, the total number of condensers may be varied via duty sharing.

Although the discussion herein has focused on the illustrated embodiment of FIG. 1 depicting a 4-bed (catalyst) system (Claus converter reactor 104 and three Claus cycling reactors 108 that operate sub-solid and switch), a fifth Claus reactor may be included (e.g., giving one Claus reactor 104 and four sub-solid switching cycling reactors 108). This addition of a fifth Claus reactor can further increase the overall sulfur recovery efficiency and advance avoiding emissions spikes during bed switches that could drop the recovery to below acceptable (e.g., regulatory compliance) levels.

Embodiments of the present techniques provide for sulfur recovery that takes advantage of Claus reaction at solid sulfur temperatures to give relatively high overall sulfur recovery efficiencies without need for a TGT unit.

Lastly, the Claus system 100 may include a control system 140 that may facilitate processes of the system 100. The control system direct the cycle sequencing of the Claus cycling reactors 108, direct operation (including operating position) of control valves in the Claus system 100, direct operation of the feed (e.g., air) to the reaction furnace of the thermal stage 102, receive input from the online analytical analyzer(s) 122, and so forth. The control system 140 may facilitate or direct operation of the system 100, such as with (1) operation of equipment generally, (2) supply or discharge of flow streams (including flowrate and pressure) and associated control valves, (3) receiving data from sensors (e.g., temperature, pressure, composition, etc.) including online analytical instruments, (4) receiving input including constraints from users, (5) performing calculations, (6) specifying set points for control devices, and so forth. The control system 110 may determine, calculate, and specify the set point of control devices, and make other control decisions. The determinations can be based on calculations performed by the control system and on operating conditions of the system 100 including feedback information from sensors and instrument transmitters, and the like. The control system 140 may receive user input that specifies the set points of control devices or other control components in the system 100. The control system 140 typically includes a user interface for a human to enter set points and other targets or constraints to the control system 140. The control system 140 may be communicatively coupled to a remote computing system that performs calculations and provides direction including values for set points.

The control system 140 may be disposed remotely in a control room, or disposed in the field such as with control modules and apparatuses distributed in the field. The control system 140 may include a desktop computer, laptop computer, computer server, programmable logic controller (PLC), distributed computing system (DSC), controllers, actuators, or control cards. The control system 140 may include a processor 142 and memory 144 storing code (e.g., logic, instructions, etc.) executed by the processor 142 to perform calculations and direct operations of the system 100. The processor 142 (hardware processor) may be one or more processors and each processor may have one or more cores. The hardware processor(s) may include a microprocessor, a central processing unit (CPU), a graphic processing unit (GPU), a controller card, circuit board, or other circuitry. The memory 144 may include volatile memory (e.g., cache and random access memory), nonvolatile memory (e.g., hard drive, solid-state drive, and read-only memory), and firmware.

Some implementations may include a control room that can be a center of activity, facilitating monitoring and control of the process or facility. The control room may contain a human machine interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data. The control system 140 can be a component of the control system based in the control room. The control system 140 may also or instead employ local control (e.g., distributed controllers, local control panels, etc.) distributed in the system 100.

Figure 2:
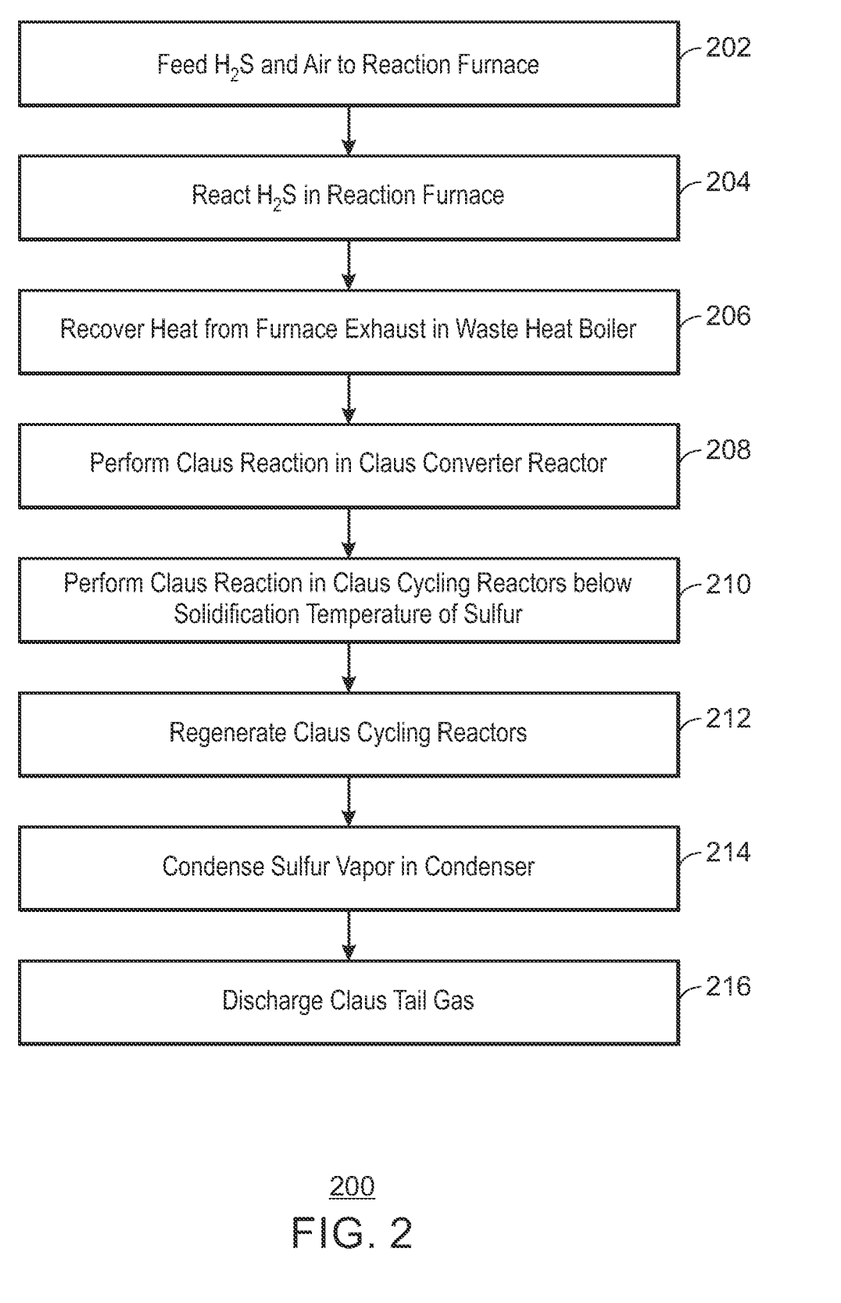
FIG. 2 is a block flow diagram of a method of operating a sulfur recovery unit (SRU) that is or includes a Claus system in accordance with embodiments of the present techniques.

FIG. 2 is method 200 of operating a SRU including a Claus system. The Claus system is configured to solidify elemental sulfur on catalyst in Claus cycling reactors during normal operation. In implementations, a majority or all of the elemental sulfur that enters and is formed in the Claus cycling reactor is intentionally solidified on the catalyst in the Claus cycling reactor. The Claus cycling reactors are operated below the solidification temperature of elemental sulfur. The Claus system may include multiple Claus cycling reactors that operate in a cycle sequence with respect to each other.

At block 202, the method includes feeding $H_2S$ and air to a reaction furnace of a thermal stage of the Claus system. Acid gas having the $H_2S$ may be fed to the reaction furnace. The air may be labeled as combustion air. In addition to (or in lieu of) air, $O_2$ may be fed to the reaction furnace. Fuel gas (e.g., natural gas or methane) may be fed to the reaction furnace.

At block 204, the method includes reacting the $H_2S$ in the reaction furnace. Some of the $H_2S$ may discharge unreacted from the reaction furnace. The reacting of the $H_2S$ in the furnace may involve the reaction $2H_2S+3O_2 \rightarrow 2SO_2+2H_2O$. The reacting of the $H_2S$ in the furnace may also typically include the Claus reaction $2H_2S+SO_2 \rightarrow 3S+2H_2O$. Thus, the method may include performing the Claus reaction including reacting $H_2S$ and $SO_2$ in the furnace to give elemental sulfur. In certain implementations, as much as 50% to 70% of the $H_2S$ entering the furnace may be converted to elemental sulfur (S) in the furnace via the Claus reaction.

At block 206, the method includes recovering heat from the exhaust of the reaction furnace in a waste heat boiler. The exhaust is a process stream discharged through the waste heat boiler. This exhaust process stream from the reaction furnace includes $H_2S$, $SO_2$, and elemental sulfur. The heat recovered by the waste heat boiler from the exhaust process stream may be utilized by the waste heat boiler to generate stream (e.g., 600-psig saturate steam) from boiler feedwater via a shell-and-tube heat exchanger.

The exhaust process stream may discharge from the reaction furnace through the waste heat boiler to a first condenser heat exchanger downstream of the waste heat boiler. Thus, the method includes discharging $H_2S$, $SO_2$, and elemental sulfur from the furnace through the waste heat boiler to the first condenser heat exchanger. The method may include condensing elemental sulfur in the first condenser heat exchanger and recovering the elemental sulfur as condensed from the first condenser heat exchanger. The method may include discharging $H_2S$ and $SO_2$ from the first condenser heat exchanger (the $H_2S$ and $SO_2$ originating from the furnace exhaust) to a Claus converter reactor for performing (block 208) the Claus reaction.

The method may also include providing a portion of the furnace-exhaust process stream from the waste heat reboiler to the Claus converter reactor, bypassing the first condenser heat exchanger, to heat the Claus converter reactor to a temperature above the dew point of elemental sulfur. The thermal stage of the Claus system includes the reaction furnace, the waste heat boiler, and the first condenser heat exchanger. Thus, the method includes providing $H_2S$ and $SO_2$ from the thermal stage to a Claus reactor. This includes both (a) the $H_2S$ and $SO_2$ from the first condenser heat exchanger and (b) the $H_2S$ and $SO_2$ (and elemental sulfur) in the bypass portion from the waste heat boiler.

The method includes recovering, via the waste heat boiler, heat from a discharge stream of the reaction furnace; condensing, via the first condenser heat exchanger, elemental sulfur in the discharge stream; and maintaining the Claus converter reactor above the dew point of sulfur by providing a bypass stream from the waste heat boiler to the Claus reactor.

At block 208, the method includes performing the Claus reaction in the Claus converter reactor to give elemental sulfur at a temperature greater than a dew point of the elemental sulfur in the Claus converter reactor. Therefore, the method includes reacting the hydrogen sulfide and the sulfur dioxide provided from the thermal stage in the Claus reactor at a temperature greater than a dew point of sulfur to give sulfur vapor. The Claus converter reactor has a first catalyst to promote and perform the Claus reaction. The Claus converter reactor stage includes the Claus converter reactor and a second condenser heat exchanger. The method includes discharging a process stream from the Claus converter reactor to the second condenser heat exchanger. The process stream discharged from the Claus converter reactor includes $H_2S$, $SO_2$, and elemental sulfur. The method includes condensing the elemental sulfur in the process stream in the second condenser heat exchanger and discharging $H_2S$ and $SO_2$ from the condenser heat exchanger to a first Claus cycling reactor of multiple Claus cycling reactors in the Claus system. The first Claus cycling reactor may be in a first operating position of a cycle, and in which the first operating position may include regeneration. The multiple Claus cycling reactors are operated in a cycle sequence, as discussed.

At block 210, the method includes performing the Claus reaction in the multiple Claus cycling reactors below the solidification temperature of elemental sulfur to give elemental sulfur at a temperature less than the solidification temperature of the elemental sulfur. The method may include cooling the Claus cycling reactors to the temperature less than the solidification temperature of the elemental sulfur via a respective heat exchanger internal to the Claus cycling reactors. In other words, the multiple Claus cycling reactors may be cooled to the temperature less than the solidification temperature of the elemental sulfur via a respective internal heat exchanger in each of the multiple Claus cycling reactors. Thus, the method includes reacting $H_2S$ and $SO_2$ in multiple Claus cycling reactors downstream of the Claus reactor at a temperature lower than the solidification of sulfur to give solid sulfur in the multiple Claus cycling reactors.

The Claus cycling reactors each have a second catalyst to perform (promote) the Claus reaction. In implementations, the second catalyst is different from the first catalyst. In some examples, the second catalyst is or includes alumina, and the first catalyst includes alumina and titania. The method includes depositing (solidifying) the elemental sulfur as solid elemental sulfur on the second catalyst in the Claus cycling reactors.

At block 212, the method includes regenerating the Claus cycling reactors in sequence, such as when a Claus cycling reactor of the multiple Claus cycling reactors is in the first position as the first Claus cycling reactor that may be subjected to regeneration. The regeneration involves heating the Claus cycling reactor, thereby forming elemental sulfur vapor from the solid elemental sulfur. The heating may be provided by a discharge stream from the Claus converter reactor to the Claus cycling reactor being regenerated. In particular, the heating of the Claus cycling reactor as the first Claus cycling reactor in the first position in regeneration may involve diverting the process stream discharged from the Claus converter reactor (block 208) to the first Claus cycling reactor, bypassing the second condenser heat exchanger of the Claus converter reactor stage. The regeneration includes discharging the formed elemental sulfur vapor from the Claus cycling reactor.

At block 214, the method includes condensing the elemental sulfur vapor discharged from the regenerating Claus cycling reactor (e.g., the first operating position) into liquid elemental sulfur in a condenser heat exchanger of that Claus cycling reactor stage (first position). The method may include recovering this liquid elemental sulfur from the condenser heat exchanger. Therefore, in view of block 212 and block 214, the method includes heating the multiple Claus cycling reactors, thereby forming sulfur vapor from the solid sulfur; and discharging the sulfur vapor from the multiple Claus cycling reactors and condensing the sulfur vapor.

At block 216, the method includes discharging Claus tail gas. For example, the Claus tail gas may be discharged from the Claus cycling reactor stage in the final position of the operational cycling sequence. The Claus tail gas may be discharged, for example, to a thermal oxidizer. The Claus tail gas may have less 0.3 percent of the sulfur compounds fed to the reaction furnace of the thermal stage. Therefore, the Claus system may be characterized as having a sulfur recovery efficiency of 99.7+ percent.

An embodiment is a method of operating a SRU including a Claus system. The method includes reacting hydrogen sulfide and oxygen in a furnace to give sulfur dioxide, and performing a Claus reaction including reacting hydrogen sulfide and sulfur dioxide in the furnace to give elemental sulfur. The method may include discharging hydrogen sulfide, sulfur dioxide, and elemental sulfur from the furnace through a waste heat boiler to a condenser heat exchanger, and condensing elemental sulfur in the condenser heat exchanger and recovering the elemental sulfur as condensed from the condenser heat exchanger. The hydrogen sulfide and the sulfur dioxide fed to the condenser heat exchanger and discharged from the condenser heat exchanger may be for a Claus reaction in a Claus reactor. The method includes performing the Claus reaction including reacting hydrogen sulfide and sulfur dioxide from the furnace in the Claus reactor to give elemental sulfur at a temperature greater than a dew point of the elemental sulfur in the Claus reactor. The Claus reactor has a first catalyst to promote the Claus reaction. The method may include heating the Claus reactor to above the dew point of the elemental sulfur by providing a bypass stream including hydrogen sulfide, sulfur dioxide, and elemental sulfur from the waste heat boiler to the Claus reactor. In implementations, the Claus reactor is not a Claus cycling reactor. The method may include discharging a process stream including hydrogen sulfide, sulfur dioxide, and elemental sulfur from the Claus reactor to another condenser heat exchanger, and condensing the elemental sulfur in the process stream in the other condenser heat exchanger and discharging hydrogen sulfide and sulfur dioxide from the other condenser heat exchanger to a Claus cycling reactor.

The method includes performing the Claus reaction including reacting hydrogen sulfide and sulfur dioxide from the Claus reactor in the Claus cycling reactor to give elemental sulfur at a temperature less than a solidification temperature of the elemental sulfur, and depositing the elemental sulfur as solid elemental sulfur on second catalyst in the Claus cycling reactor. The Claus cycling reactor has the second catalyst to promote the Claus reaction. The depositing of the elemental sulfur may involve solidifying the elemental sulfur. The method may include cooling the Claus cycling reactor to the temperature less than the solidification temperature of the elemental sulfur via a heat exchanger internal to the Claus cycling reactor. The method includes regenerating the Claus cycling reactor, including heating the Claus cycling reactor, thereby forming elemental sulfur vapor from the solid elemental sulfur, and discharging the elemental sulfur vapor from the Claus cycling reactor. The method may include condensing the elemental sulfur vapor discharged from the Claus cycling reactor into liquid elemental sulfur in yet another condenser heat exchanger, and recovering the liquid elemental sulfur from this condenser heat exchanger. The heating of the Claus cycling reactor for regenerating may involve providing a discharge stream from the Claus reactor to the Claus cycling reactor. The heating of the Claus cycling reactor may involve diverting the process stream discharged from the Claus reactor to the Claus cycling reactor bypassing the other condenser heat exchanger. The Claus system may include multiple Claus cycling reactors (including the aforementioned Claus cycling reactor) that operate in a cycle sequence with respect to each other. The multiple Claus cycling reactors may each have the second catalyst. In certain implementations, the first catalyst is different from the second catalyst. In some implementations, the first catalyst includes alumina and titania, and the second catalyst includes alumina.

Another embodiment is a method of operating a SRU including a Claus system. The method includes providing hydrogen sulfide and sulfur dioxide from a thermal stage to a Claus reactor. The thermal stage includes a reaction furnace, a waste heat boiler, and a condenser heat exchanger. The Claus reactor has catalyst to perform a Claus reaction. The method includes reacting the hydrogen sulfide and the sulfur dioxide in the Claus reactor at a temperature greater than a dew point of sulfur to give sulfur vapor. The method may include recovering, via the waste heat boiler, heat from a discharge stream of the reaction furnace; condensing, via the condenser heat exchanger, elemental sulfur in the discharge stream; and maintaining the Claus reactor above the dew point of sulfur by providing a bypass stream from the waste heat boiler to the Claus reactor. The method includes reacting hydrogen sulfide and sulfur dioxide in multiple Claus cycling reactors downstream of the Claus reactor at a temperature lower than a solidification of sulfur to give solid sulfur in the multiple Claus cycling reactors, wherein the multiple Claus cycling reactor each have a catalyst to perform the Claus reaction. The method includes heating the multiple Claus cycling reactors, thereby forming sulfur vapor from the solid sulfur, and discharging the sulfur vapor from the multiple Claus cycling reactors and condensing the sulfur vapor. The method may include cooling the multiple Claus cycling reactors to the temperature less than the solidification temperature of the sulfur via a respective internal heat exchanger in each of the multiple Claus cycling reactors. The method may include depositing the solid sulfur on the catalyst in the multiple Claus cycling reactors. The catalyst in the multiple Claus cycling reactors may be different than the catalyst in the Claus reactor.

Yet another embodiment is a SRU including a Claus system. The Claus system includes a thermal stage having a reaction furnace to convert hydrogen sulfide into sulfur dioxide and elemental sulfur. The thermal stage has a waste heat boiler to recover heat from a combustion product discharged from the reaction furnace, the combustion product being a process stream having hydrogen sulfide, sulfur dioxide, and elemental sulfur. The thermal stage may have a first condenser heat exchanger to receive the process stream discharged from the waste heat boiler and condense elemental sulfur in the process stream for removal of the elemental sulfur as condensed from the process stream. The Claus system includes a Claus reactor stage including a Claus reactor having a first catalyst to convert hydrogen sulfide and sulfur dioxide received from the thermal stage into elemental sulfur at a temperature above a dew point of the elemental sulfur. The first catalyst may include, for example, alumina and titania. The Claus system includes Claus cycling reactors downstream of the Claus reactor stage. The Claus cycling reactors each have a second catalyst (e.g., including alumina) to convert hydrogen sulfide and sulfur dioxide into elemental sulfur at a temperature below a solidification temperature of the elemental sulfur to solidify the elemental sulfur as solid elemental sulfur on the second catalyst. The Claus cycling reactors each have an internal heat exchanger to cool the Claus cycling reactors, respectively, to below the solidification temperature of the elemental sulfur. The internal heat exchanger may include, for example, cooling coils or cold plates, or a combination thereof The thermal stage may include the first condenser heat exchanger to receive the process stream from the waste heat boiler and condense elemental sulfur in the process stream and discharge hydrogen sulfide and sulfur dioxide received at the Claus reactor. The Claus system may include a bypass valve to provide a portion of the process stream from the waste heat boiler around the first condenser to the Claus reactor to heat the Claus reactor, wherein the Claus reactor stage does not include a reheater heat exchanger. The Claus reactor stage may have a second condenser heat exchanger to condense elemental sulfur discharged from the Claus reactor. The second condenser heat exchanger if employed may be configured to discharge hydrogen sulfide and sulfur dioxide to the Claus cycling reactors. The second condenser if employed may be configured to discharge hydrogen sulfide and sulfur dioxide to a Claus cycling reactor of the Claus cycling reactors in a first operational position of a cycle sequence of the Claus cycling reactors. A Claus cycling reactor stage including a Claus cycling reactor of the Claus cycling reactors in a final operational position of the of the cycle sequence may be configured to discharge Claus tail gas to a thermal oxidizer. The Claus tail gas may have less than 0.3% of the hydrogen sulfide that enters the reaction furnace in amount of hydrogen sulfide per unit of time. The Claus cycling reactors may each be associated with a condenser heat exchanger to condense elemental sulfur vapor discharged from the Claus cycling reactors, respectively.

Yet another embodiment is a SRU including a Claus system. The Claus system includes a thermal stage including a reaction furnace to convert hydrogen sulfide into sulfur dioxide and elemental sulfur, a waste heat boiler to recover heat from an exhaust of the reaction furnace, and a first condenser heat exchanger to condense elemental sulfur in the exhaust and discharge hydrogen sulfide and sulfur dioxide from the exhaust to a Claus reactor. In implementations, the Claus reactor is not a Claus cycling reactor. The Claus system includes the Claus reactor having a first catalyst to convert hydrogen sulfide and sulfur dioxide received from the thermal stage into elemental sulfur at a temperature above a dew point of the elemental sulfur and discharge a process stream including hydrogen sulfide, sulfur dioxide, and elemental sulfur to a second condenser heat exchanger. The Claus system includes the second condenser heat exchanger to condense elemental sulfur in the process stream and discharge hydrogen sulfide and sulfur dioxide to a first Claus cycling reactor of multiple Claus cycling reactors. The Claus system may have a bypass conduit and a bypass valve disposed along the bypass conduit to provide a portion of the exhaust from the waste heat boiler to the Claus reactor to heat the Claus reactor to above the dew point of the elemental sulfur.

The Claus system includes the multiple Claus cycling reactors each having a second catalyst to convert hydrogen sulfide and sulfur dioxide into elemental sulfur at a temperature below a solidification temperature of the elemental sulfur and deposit the elemental sulfur as solid elemental sulfur on the second catalyst. The second catalyst may different from the first catalyst. In implementations, the first catalyst includes titania and alumina, and the second catalyst includes alumina. The multiple Claus cycling reactors may be disposed operationally downstream of the Claus reactor. Each of the multiple Claus cycling reactors have an internal heat exchanger (e.g., cooling coils or cold plates, or a combination thereof) to cool the second catalyst to below the solidification temperature of sulfur.

The Claus system may have a bypass conduit and a 3-way valve to divert the process stream discharged from the Claus reactor to the first Claus cycling reactor bypassing the second condenser heat exchanger to heat the first Claus cycling reactor to above the dew point of the elemental sulfur to generate the elemental sulfur vapor from the solid elemental sulfur deposited on the second catalyst in the first Claus cycling reactor. The Claus system may include a third condenser heat exchanger to receive and condense the elemental sulfur vapor from the first Claus cycling reactor. The Claus system may include a first Claus cycling reactor stage having the first Claus cycling reactor and the third condenser heat exchanger to receive and condense elemental sulfur vapor from the first Claus cycling reactor; a second Claus cycling reactor stage to receive hydrogen sulfide and sulfur dioxide from the first Claus cycling reactor stage, the second Claus cycling reactor stage including a second Claus cycling reactor of the multiple Claus cycling reactors and a fourth condenser heat exchanger; and a third Claus cycling reactor stage to receive hydrogen sulfide and sulfur dioxide from the second Claus cycling reactor stage, the third Claus cycling reactor stage including a third Claus cycling reactor of the multiple Claus cycling reactors and a fifth condenser heat exchanger.

A number of implementations have been described. Nevertheless, it will be understood that various modifications may be made without departing from the spirit and scope of the disclosure.

What is claimed is:

1. A method of operating a sulfur recovery system (SRU) comprising a Claus system, the method comprising:
   reacting hydrogen sulfide and oxygen in a furnace to give sulfur dioxide, and performing a Claus reaction comprising reacting hydrogen sulfide and sulfur dioxide in the furnace to give elemental sulfur;
   performing the Claus reaction comprising reacting hydrogen sulfide and sulfur dioxide from the furnace in a Claus reactor to give elemental sulfur at a temperature greater than a dew point of the elemental sulfur in the Claus reactor, the Claus reactor comprising a first catalyst to promote the Claus reaction;
   performing the Claus reaction comprising reacting hydrogen sulfide and sulfur dioxide from the Claus reactor in a Claus cycling reactor to give elemental sulfur at a temperature less than a solidification temperature of the elemental sulfur, the Claus cycling reactor comprising a second catalyst to promote the Claus reaction;
   depositing the elemental sulfur as solid elemental sulfur on the second catalyst in the Claus cycling reactor; and
   regenerating the Claus cycling reactor, the regenerating comprising heating the Claus cycling reactor, thereby forming elemental sulfur vapor from the solid elemental sulfur, and discharging the elemental sulfur vapor from the Claus cycling reactor, wherein the Claus system comprises multiple Claus cycling reactors that operate in a cycle sequence with respect to each other, the multiple Claus cycling reactors comprising the Claus cycling reactor, wherein the multiple Claus cycling reactors each comprise the second catalyst, and wherein the first catalyst is different from the second catalyst.

2. The method of claim 1, comprising:
   condensing the elemental sulfur vapor discharged from the Claus cycling reactor into liquid elemental sulfur in a condenser heat exchanger; and
   recovering the liquid elemental sulfur from the condenser heat exchanger, wherein the Claus reactor is not a Claus cycling reactor.

3. The method of claim 1, comprising:
   discharging hydrogen sulfide, sulfur dioxide, and elemental sulfur from the furnace through a waste heat boiler to a condenser heat exchanger; and
   condensing elemental sulfur in the condenser heat exchanger and recovering the elemental sulfur as condensed from the condenser heat exchanger, wherein the hydrogen sulfide and the sulfur dioxide from the furnace for the Claus reaction in the Claus reactor comprises hydrogen sulfide and sulfur dioxide from the condenser heat exchanger.

4. The method of claim 3, comprising heating the Claus reactor to above the dew point of the elemental sulfur by providing a bypass stream comprising hydrogen sulfide, sulfur dioxide, and elemental sulfur from the waste heat boiler to the Claus reactor, wherein the first catalyst comprises alumina and titania, and wherein the second catalyst comprises alumina.

5. The method of claim 1, comprising cooling the Claus cycling reactor to the temperature less than the solidification temperature of the elemental sulfur via a heat exchanger internal to the Claus cycling reactor, wherein depositing the elemental sulfur comprises solidifying the elemental sulfur, and wherein heating the Claus cycling reactor comprises providing a discharge stream from the Claus reactor to the Claus cycling reactor.

6. The method of claim 1, comprising:
   discharging a process stream from the Claus reactor to a condenser heat exchanger, the process stream comprising hydrogen sulfide, sulfur dioxide, and elemental sulfur; and
   condensing the elemental sulfur in the process stream in the condenser heat exchanger and discharging hydrogen sulfide and sulfur dioxide from the condenser heat exchanger to the Claus cycling reactor, wherein heating the Claus cycling reactor comprises diverting the process stream from the Claus reactor to the Claus cycling reactor bypassing the condenser heat exchanger.

7. A method of operating a sulfur recovery system (SRU) comprising a Claus system, the method comprising:
   providing hydrogen sulfide and sulfur dioxide from a thermal stage to a Claus reactor, the thermal stage comprising a reaction furnace, a waste heat boiler, and a condenser heat exchanger;
   reacting the hydrogen sulfide and the sulfur dioxide in the Claus reactor at a temperature greater than a dew point of sulfur to give sulfur vapor, the Claus reactor having catalyst to perform a Claus reaction;
   reacting hydrogen sulfide and sulfur dioxide in multiple Claus cycling reactors downstream of the Claus reactor at a temperature lower than a solidification of sulfur to give solid sulfur in the multiple Claus cycling reactors, wherein the multiple Claus cycling reactor each have a catalyst to perform the Claus reaction;
   heating the multiple Claus cycling reactors, thereby forming sulfur vapor from the solid sulfur; and discharging the sulfur vapor from the multiple Claus cycling reactors and condensing the sulfur vapor.

8. The method of claim 7, comprising:
recovering, via the waste heat boiler, heat from a discharge stream of the reaction furnace;
condensing, via the condenser heat exchanger, elemental sulfur in the discharge stream; and
maintaining the Claus reactor above the dew point of sulfur by providing a bypass stream from the waste heat boiler to the Claus reactor.

9. The method of claim 7, comprising:
cooling the multiple Claus cycling reactors to the temperature less than the solidification temperature of the sulfur via a respective internal heat exchanger in each of the multiple Claus cycling reactors; and
depositing the solid sulfur on the catalyst in the multiple Claus cycling reactors, wherein the catalyst in the multiple Claus cycling reactors is different than the catalyst in the Claus reactor.

10. A sulfur recovery system (SRU) comprising a Claus system comprising:
a thermal stage comprising:
a reaction furnace to convert hydrogen sulfide into sulfur dioxide and elemental sulfur; and
a waste heat boiler to recover heat from a combustion product discharged from the reaction furnace, the combustion product comprising a process stream comprising hydrogen sulfide, sulfur dioxide, and elemental sulfur;
a Claus reactor stage comprising a Claus reactor having a first catalyst to convert hydrogen sulfide and sulfur dioxide received from the thermal stage into elemental sulfur at a temperature above a dew point of the elemental sulfur; and
Claus cycling reactors downstream of the Claus reactor stage, the Claus cycling reactors each having a second catalyst to convert hydrogen sulfide and sulfur dioxide into elemental sulfur at a temperature below a solidification temperature of the elemental sulfur to solidify the elemental sulfur as solid elemental sulfur on the second catalyst, wherein the Claus cycling reactors each comprise an internal heat exchanger to cool the Claus cycling reactors, respectively, to below the solidification temperature of the elemental sulfur.

11. The Claus system of claim 10, wherein thermal stage comprises a first condenser heat exchanger to receive the process stream discharged from the waste heat boiler and condense elemental sulfur in the process stream for removal of the elemental sulfur as condensed from the process stream.

12. The Claus system of claim 11, wherein the Claus cycling reactors are each associated with a condenser heat exchanger to condense elemental sulfur vapor discharged from the Claus cycling reactors, respectively.

13. The Claus system of claim 10, wherein the internal heat exchanger comprises cooling coils or cold plates, or a combination thereof, wherein the first catalyst comprises alumina and titania, and wherein the second catalyst comprises alumina.

14. The Claus system of claim 10, wherein the thermal stage comprises a first condenser heat exchanger to receive the process stream from the waste heat boiler and condense elemental sulfur in the process stream and discharge hydrogen sulfide and sulfur dioxide received at the Claus reactor, and wherein the Claus reactor stage comprises a second condenser heat exchanger to condense elemental sulfur discharged from the Claus reactor.

15. The Claus system of claim 14, comprising a bypass valve to provide a portion of the process stream from the waste heat boiler around the first condenser to the Claus reactor to heat the Claus reactor, wherein the Claus reactor stage does not comprise a reheater heat exchanger.

16. The Claus system of claim 14, wherein the second condenser heat exchanger is configured to discharge hydrogen sulfide and sulfur dioxide to the Claus cycling reactors.

17. The Claus system of claim 14, wherein the second condenser is configured to discharge hydrogen sulfide and sulfur dioxide to a Claus cycling reactor of the Claus cycling reactors in a first operational position of a cycle sequence of the Claus cycling reactors.

18. The Claus system of claim 17, wherein a Claus cycling reactor stage comprising a Claus cycling reactor of the Claus cycling reactors in a final operational position of the of the cycle sequence is configured to discharge Claus tail gas to a thermal oxidizer, the Claus tail gas comprising less than 0.3% of the hydrogen sulfide that enters the reaction furnace in amount of hydrogen sulfide per unit of time.

19. A sulfur recovery system (SRU) comprising a Claus system comprising:
a thermal stage comprising a reaction furnace to convert hydrogen sulfide into sulfur dioxide and elemental sulfur, a waste heat boiler to recover heat from an exhaust of the reaction furnace, and a first condenser heat exchanger to condense elemental sulfur in the exhaust and discharge hydrogen sulfide and sulfur dioxide from the exhaust to a Claus reactor;
the Claus reactor having a first catalyst to convert hydrogen sulfide and sulfur dioxide received from the thermal stage into elemental sulfur at a temperature above a dew point of the elemental sulfur and discharge a process stream comprising hydrogen sulfide, sulfur dioxide, and elemental sulfur to a second condenser heat exchanger;
the second condenser heat exchanger to condense elemental sulfur in the process stream and discharge hydrogen sulfide and sulfur dioxide to a first Claus cycling reactor of multiple Claus cycling reactors; and
the multiple Claus cycling reactors each having a second catalyst to convert hydrogen sulfide and sulfur dioxide into elemental sulfur at a temperature below a solidification temperature of the elemental sulfur and deposit the elemental sulfur as solid elemental sulfur on the second catalyst, wherein each of the multiple Claus cycling reactors comprises an internal heat exchanger to cool the second catalyst to below the solidification temperature of sulfur.

20. The Claus system of claim 19, comprising a bypass conduit and a bypass valve disposed along the bypass conduit to provide a portion of the exhaust from the waste heat boiler to the Claus reactor to heat the Claus reactor to above the dew point of the elemental sulfur, wherein the first catalyst is different from the second catalyst, and wherein the multiple Claus cycling reactors are disposed operationally downstream of the Claus reactor.

21. The Claus system of claim 19, wherein the internal heat exchanger comprises cooling coils or cold plates, or a combination thereof, wherein first catalyst comprises titania and alumina, wherein the second catalyst comprises alumina, and wherein the Claus reactor does not comprise a Claus cycling reactor.

22. The Claus system of claim 19, comprising:
a bypass conduit and a 3-way valve to divert the process stream discharged from the Claus reactor to the first Claus cycling reactor instead of to the second condenser heat exchanger to heat the first Claus cycling reactor to above the dew point of the elemental sulfur to generate elemental sulfur vapor from the solid elemental sulfur deposited on the second catalyst in the first Claus cycling reactor; and a third condenser heat exchanger to receive and condense the elemental sulfur vapor from the first Claus cycling reactor.

23. The Claus system of claim 19, comprising:

a first Claus cycling reactor stage comprising the first Claus cycling reactor and a third condenser heat exchanger to receive and condense elemental sulfur vapor from the first Claus cycling reactor;

a second Claus cycling reactor stage to receive hydrogen sulfide and sulfur dioxide from the first Claus cycling reactor stage, the second Claus cycling reactor stage comprising a second Claus cycling reactor of the multiple Claus cycling reactors and a fourth condenser heat exchanger; and a third Claus cycling reactor stage to receive hydrogen sulfide and sulfur dioxide from the second Claus cycling reactor stage, the third Claus cycling reactor stage comprising a third Claus cycling reactor of the multiple Claus cycling reactors and a fourth condenser heat exchanger.

24. The Claus system of claim 23, comprising a bypass conduit and a 3-way valve to divert the process stream discharged from the Claus reactor to the first Claus cycling reactor bypassing the second condenser heat exchanger to heat the first Claus cycling reactor to above the dew point of the elemental sulfur to generate the elemental sulfur vapor from the solid elemental sulfur deposited on the second catalyst in the first Claus cycling reactor.

\* \* \* \* \*

UNITED STATES PATENT AND TRADEMARK OFFICE
CERTIFICATE OF CORRECTION

PATENT NO. : 11,655,149 B1
APPLICATION NO. : 17/517280
DATED : May 23, 2023
INVENTOR(S) : John O'Connell Page 1 of 1

It is certified that error appears in the above-identified patent and that said Letters Patent is hereby corrected as shown below:

In the Claims

In Column 30, Line 17, Claim 18, please replace "the of the" with -- the --.

Signed and Sealed this
Fifth Day of December, 2023

Katherine Kelly Vidal
*Director of the United States Patent and Trademark Office*